US009774563B2

(12) United States Patent
Wang et al.

(10) Patent No.: US 9,774,563 B2
(45) Date of Patent: Sep. 26, 2017

(54) PACKET TRANSMISSION METHOD, APPARATUS, AND SYSTEM IN MULTICAST DOMAIN NAME SYSTEM

(71) Applicant: Huawei Technologies Co., Ltd., Shenzhen (CN)

(72) Inventors: Chunning Wang, Nanjing (CN); Yibin Xu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 47 days.

(21) Appl. No.: 14/992,085

(22) Filed: Jan. 11, 2016

(65) Prior Publication Data

US 2016/0127306 A1 May 5, 2016

Related U.S. Application Data

(63) Continuation of application No. PCT/CN2014/081327, filed on Jul. 1, 2014.

(30) Foreign Application Priority Data

Jul. 11, 2013 (CN) .......................... 2013 1 0291011

(51) Int. Cl.
*H04L 12/28* (2006.01)
*H04L 12/56* (2006.01)
(Continued)

(52) U.S. Cl.
CPC .......... *H04L 61/1511* (2013.01); *H04L 12/18* (2013.01); *H04L 12/4641* (2013.01);
(Continued)

(58) Field of Classification Search
None
See application file for complete search history.

(56) References Cited

U.S. PATENT DOCUMENTS 6,769,031 B1 * 7/2004 Bero ................. H04L 29/12066
707/999.01
7,573,903 B2 * 8/2009 Miyata .............. H04L 29/12066
370/395.54
(Continued)

FOREIGN PATENT DOCUMENTS

CN 101212315 A 7/2008
CN 101785281 A 7/2010

OTHER PUBLICATIONS

Cheshire, S., et al., "Multicast DNS," RFC 6762, Feb. 2013, 70 pages.
(Continued)

*Primary Examiner* — Lonnie Sweet
(74) *Attorney, Agent, or Firm* — Conley Rose, P.C.

(57) ABSTRACT

A packet transmission method, apparatus, and system in a multicast domain name system (mDNS), which are used to resolve a network bandwidth waste problem due to much service information needs to be transmitted in an mDNS-based network. The method includes, converting, by a relay, a known-answer service query packet that is sent by a user terminal and used to query service information in an mDNS, into a unicast known-answer service query packet and sending the unicast known-answer service query packet to a gateway, receiving, by the relay, a unicast known-answer service answer packet that is sent by the gateway and includes service information unknown to the user terminal, and converting, by the relay, the unicast known-answer service answer packet into a multicast known-answer service answer packet and sending the multicast known-answer service answer packet to the user terminal.

10 Claims, 9 Drawing Sheets

(51) Int. Cl.
*H04L 29/12* (2006.01)
*H04L 12/46* (2006.01)
*H04L 12/18* (2006.01)
*H04L 29/08* (2006.01)

(52) U.S. Cl.
CPC .......... *H04L 61/1541* (2013.01); *H04L 67/16* (2013.01); *H04L 61/6013* (2013.01)

(56) References Cited

U.S. PATENT DOCUMENTS

| | | | |
|---|---|---|---|
| 2003/0182269 A1* | 9/2003 | Cheshire | H04L 61/1552 |
| 2007/0150570 A1 | 6/2007 | Eastham | |
| 2007/0253377 A1* | 11/2007 | Janneteau | H04L 29/12066 370/338 |
| 2008/0086574 A1* | 4/2008 | Raciborski | H04L 29/12066 709/245 |
| 2008/0189437 A1* | 8/2008 | Halley | H04L 12/14 709/245 |
| 2009/0063686 A1 | 3/2009 | Schmidt et al. | |
| 2010/0274970 A1* | 10/2010 | Treuhaft | H04L 29/12066 711/118 |
| 2012/0079055 A1* | 3/2012 | Robinson | H04L 61/1511 709/213 |
| 2012/0124239 A1* | 5/2012 | Shribman | H04L 61/1511 709/245 |
| 2012/0314641 A1* | 12/2012 | Kotecha | H04H 20/42 370/312 |
| 2013/0232492 A1* | 9/2013 | Wang | H04L 61/2084 718/1 |
| 2013/0346564 A1* | 12/2013 | Warrick | H04L 41/0893 709/219 |
| 2014/0007238 A1* | 1/2014 | Magee | G06F 21/577 726/24 |

OTHER PUBLICATIONS

Foreign Communication From a Counterpart Application, PCT Application No. PCT/CN2014/081327, English Translation of International Search Report dated Oct. 13, 2014, 2 pages.
Foreign Communication From a Counterpart Application, PCT Application No. PCT/CN2014/081327, English Translation of Written Opinion dated Oct. 13, 2014, 6 pages.
Cisco, "Wireless LAN Apple Bonjour Deployment Guide," Retrieved from the Internet: URL:http://www.cisco.com/c/en/us/support/docs/wireless/aironet-1100-series-access-point/113443-cuwn-apple-bonjour-dg-00.html [retrieved on Jun. 22, 2016], Oct. 15, 2012, 15 pages.
"Bonjour Deployment," Retrieved from the Internet: URL: http://www.cisco.com/c/en/us/td/docs/wireless/technology/bonjour/Bonjour74.pdf [retrieved on Jun. 22, 2016], Apr. 4, 2013, 19 pages.
Foreign Communication From a Counterpart Application, European Application No. 14822797.8, Extended European Search Report dated Jun. 29, 2016, 12 pages.
Calhoun, P., Ed., et al., "Control and Provisioning of Wireless Access Points (CAPWAP) Protocol Specification," RFC5415, Mar. 2009, 156 pages.
Foreign Communication From A Counterpart Application, European Application No. 14822797.8, European Office Action dated May 10, 2017, 5 pages.

* cited by examiner

PACKET TRANSMISSION METHOD, APPARATUS, AND SYSTEM IN MULTICAST DOMAIN NAME SYSTEM

CROSS-REFERENCE TO RELATED APPLICATIONS

This application is a continuation of International Application No. PCT/CN2014/081327, filed on Jul. 1, 2014, which claims priority to Chinese Patent Application No. 201310291011.5, filed on Jul. 11, 2013, both of which are hereby incorporated by reference in their entireties.

TECHNICAL FIELD

This application relates to the field of network communications technologies, and in particular, to a packet transmission method, apparatus, and system in a multicast domain name system (mDNS).

BACKGROUND

Zero-configuration networking (zeroconf) refers to a special technology that can automatically create a usable computer network based on the Internet Protocol (IP) suite when computer devices or network peripheral devices are interconnected.

The Bonjour technology is one zeroconf technology, and the Bonjour technology is implemented based on mDNS and domain name system (DNS) based service discovery (DNS-SD). Using the Bonjour technology, a user terminal in a network can automatically propagate service information of the user terminal itself and can obtain service information of another user terminal in the network, as if one user terminal is greeting another user terminal. Service information of a user terminal is information about a service-providing user terminal, includes a service type such as printing, video playing, and other services of the service-providing user terminal, and may further include information such as an identity of the service-providing user terminal. The identity of the service-providing user terminal may be an address, in a network, of the service-providing user terminal, or a service name corresponding to the service type provided by the service-providing user terminal. Using the Bonjour technology, a service, such as printing and video playing, provided by a user terminal in an IP network can still be found by another user terminal in the network even if there is no network administrator.

However, in the Bonjour technology, because a reserved multicast address is used in an mDNS, the Bonjour technology can be implemented only when all user terminals are in a same virtual local area network (VLAN). Therefore, there is a specific limitation during implementation of the Bonjour technology. To enhance applicability of the Bonjour technology, an application scope of the Bonjour technology can be extended by adding a relay and a gateway to a network. The relay is a network device used to support packet transmission between a user terminal and the gateway. The gateway is a network device that processes a packet that is forwarded by the relay and sent by the user terminal, and the gateway forwards a processing result to the user terminal using the relay. As shown in FIG. 1, each VLAN has only one relay, and one relay may be located in different VLANs. The relay in each VLAN may be connected to, in a wired or wireless manner, different user terminals that support the Bonjour technology. The relay is in a same VLAN as a user terminal that supports Bonjour; converts a received multicast packet sent by the user terminal into a unicast packet, and then sends the converted unicast packet to the gateway. Relays in multiple VLANs may be connected to a same gateway, and the relays forward, using the connected gateway, packets sent by user terminals located in different VLANs. The gateway collects and records a relay address included in a service-requesting packet that is forwarded by the relay in each VLAN and sent by a user terminal, searches for, according to the received service-requesting packet, a corresponding service-providing user terminal, and sends, according to the recorded relay address, a search result to the user terminal using the relay. When the service-requesting user terminal and the service-providing user terminal are located in different VLANs, the service-requesting user terminal learns, using the relay and the gateway, a service provided by the service-providing user terminal.

Because there are multiple VLANs in a network, and service information of a user terminal in each VLAN is sent by a gateway to a user terminal that sends a service-requesting packet, much service information needs to be transmitted in an mDNS-based network, which results in network bandwidth waste.

SUMMARY

Embodiments of the present disclosure provides a packet transmission method, apparatus, and system in a mDNS, which are used to resolve a network bandwidth waste problem because generally much service information needs to be transmitted in an mDNS-based multi-VLAN.

According to a first aspect, a packet transmission method in a mDNS is provided, including: converting, by a relay, a multicast known-answer service query packet that is sent by a user terminal and used to query service information in an mDNS, into a unicast known-answer service query packet and sending the unicast known-answer service query packet to a gateway, where an identity field of the unicast known-answer service query packet includes a terminal identity determined by the relay for the user terminal that sends the multicast known-answer service query packet; receiving, by the relay, a unicast known-answer service answer packet that is sent by the gateway and includes service information unknown to the user terminal, where the service information unknown to the user terminal is obtained by the gateway after removing, based on the terminal identity included in the received unicast known-answer service query packet, all service information known to the user terminal corresponding to the terminal identity from an established correspondence between a terminal identity and known service information; and converting, by the relay, the unicast known-answer service answer packet into a multicast known-answer service answer packet and sending the multicast known-answer service answer packet to the user terminal.

In a first possible implementation manner of the first aspect, the terminal identity included in the identity field of the unicast known-answer service query packet is one of the following: a media access control (MAC) address of the user terminal; an IP address of the user terminal; a serial number of the user terminal generated according to an address of the user terminal; and a serial number allocated by the relay to the user terminal.

According to a second aspect, a packet transmission method in a mDNS is provided, including: obtaining, by a gateway, a terminal identity in an identity field of a unicast known-answer service query packet sent by a relay, and obtaining known service information in the unicast known-answer service query packet, adding, by the gateway according to a gateway-saved correspondence between a terminal identity and known service information, the known service information obtained from the unicast known-answer service query packet to the gateway-saved correspondence between a terminal identity and known service information and to known service information corresponding to the terminal identity obtained from the unicast known-answer service query packet, determining, from the gateway-saved correspondence between a terminal identity and known service information, the known service information corresponding to the terminal identity obtained from the unicast known-answer service query packet, where the known service information obtained from the unicast known-answer service query packet has been added to the gateway-saved correspondence, determining, by the gateway, all service information corresponding to a service type that is requested by a user terminal and obtained from the received unicast known-answer service query packet, obtaining, by the gateway after removing the determined known service information from the determined all service information, service information that is unknown to the user terminal and corresponding to the service type requested by the user terminal corresponding to the terminal identity obtained from the unicast known-answer service query packet, and sending, by the gateway to the relay, a unicast known-answer service answer packet that includes the unknown service information.

In a first possible implementation manner of the second aspect, after the obtaining, by a gateway, a terminal identity and known service information in the unicast known-answer service query packet, the method further includes: if the gateway-saved correspondence between a terminal identity and known service information does not include the terminal identity obtained from the unicast known-answer service query packet, establishing, in the gateway-saved correspondence between a terminal identity and known service information, a correspondence between the terminal identity obtained from the unicast known-answer service query packet and the known service information obtained from the unicast known-answer service query packet.

With reference to the second aspect or the first possible implementation manner of the second aspect, in a second possible implementation manner of the second aspect, after the obtaining, by a gateway, a terminal identity in an identity field of a unicast known-answer service query packet sent by a relay, the method further includes: obtaining, by the gateway, an address of the relay, where the gateway-saved correspondence between a terminal identity and known service information further includes the address of the relay.

According to a third aspect, a packet transmission apparatus in a mDNS is provided, including: a packet receiving unit configured to receive a multicast known-answer service query packet that is sent by a user terminal and used to query service information in an mDNS, and transmit the received multicast known-answer service query packet to a packet conversion unit, the packet conversion unit configured to obtain the multicast known-answer service query packet transmitted by the packet receiving unit, convert the obtained multicast known-answer service query packet into a unicast known-answer service query packet, and transmit the unicast known-answer service query packet to a packet sending unit, and the packet sending unit configured to obtain the unicast known-answer service query packet transmitted by the packet conversion unit, and send the obtained unicast known-answer service query packet to a gateway, where an identity field of the unicast known-answer service query packet includes a terminal identity determined by the relay for the user terminal that sends the multicast known-answer service query packet, where the packet receiving unit is further configured to receive a unicast known-answer service answer packet that is sent by the gateway and includes service information unknown to the user terminal, and transmit the unicast known-answer service answer packet to the packet conversion unit, where the service information unknown to the user terminal is obtained by the gateway after removing, based on the terminal identity included in the received unicast known-answer service query packet, all service information known to the user terminal corresponding to the terminal identity from an established correspondence between a terminal identity and known service information. The packet conversion unit is further configured to obtain the unicast known-answer service answer packet transmitted by the packet receiving unit, convert the obtained unicast known-answer service answer packet into a multicast known-answer service answer packet, and transmit the multicast known-answer service answer packet to the packet sending unit, and the packet sending unit is further configured to obtain the multicast known-answer service answer packet transmitted by the packet conversion unit, and send the multicast known-answer service answer packet to the user terminal.

In a first possible implementation manner of the third aspect, the terminal identity included in the identity field of the unicast known-answer service query packet sent by the packet sending unit is one of the following: a MAC address of the user terminal, an IP address of the user terminal, a serial number of the user terminal generated according to an address of the user terminal; and a serial number allocated by the relay to the user terminal.

According to a fourth aspect, a packet transmission apparatus in a mDNS is provided, including: a receiving unit configured to receive a unicast known-answer service query packet sent by a relay, and transmit the unicast known-answer service query packet to an obtaining unit, an obtaining unit configured to obtain the unicast known-answer service query packet transmitted by the receiving unit, obtain a terminal identity in an identity field of the unicast known-answer service query packet, obtain known service information in the unicast known-answer service query packet, and transmit the obtained terminal identity and service information known to a user terminal to a correspondence determining unit. The correspondence determining unit configured to obtain the obtained terminal identity and the service information known to the user terminal that are transmitted by the obtaining unit, add, according to a saved correspondence between a terminal identity and known service information, the known service information obtained from the unicast known-answer service query packet to the saved correspondence between a terminal identity and known service information and to known service information corresponding to the terminal identity obtained from the unicast known-answer service query packet, and transmit an updated correspondence between a terminal identity and known service information to the obtaining unit, where the obtaining unit is further configured to obtain the updated correspondence, transmitted by the correspondence determining unit, between a terminal identity and known service information, determine, from the gateway-saved correspondence between a terminal identity and known service information, the known service information corresponding to the terminal identity obtained from the unicast known-answer service query packet, and transmit the obtained known service information to a service information determining unit, where the known service information obtained from the unicast known-answer service query packet has been added to the gateway-saved correspondence. The service information determining unit configured to obtain the known service information transmitted by the obtaining unit, determine all service information corresponding to a service type that is requested by the user terminal and obtained from the received unicast known-answer service query packet, obtain, after the determined known service information is removed from the determined all service information, service information that is unknown to the user terminal and corresponding to the service type requested by the user terminal corresponding to the terminal identity obtained from the unicast known-answer service query packet, and transmit the unknown service information to a sending unit, and the sending unit configured to obtain the unknown service information transmitted by the service information determining unit, and send, to the relay, a unicast known-answer service answer packet that includes the unknown service information.

In a first possible implementation manner of the fourth aspect, the correspondence determining unit is further configured to, if the saved correspondence between a terminal identity and known service information does not include the terminal identity obtained from the unicast known-answer service query packet, establish, in the saved correspondence between a terminal identity and known service information, a correspondence between the terminal identity obtained from the unicast known-answer service query packet and the known service information obtained from the unicast known-answer service query packet.

With reference to the fourth aspect or the first possible implementation manner of the fourth aspect, in a second possible implementation manner of the fourth aspect, the obtaining unit is further configured to, after the terminal identity in the identity field of the unicast known-answer service query packet sent by the relay is obtained, obtain an address of the relay, and transmit the obtained address of the relay to the correspondence determining unit, and the correspondence determining unit is configured to obtain the address of the relay transmitted by the obtaining unit, where the saved correspondence between a terminal identity and known service information further includes the address of the relay.

According to a fifth aspect, a packet transmission system in a mDNS is provided, including a relay and a gateway, where the relay is configured to convert a multicast known-answer service query packet that is sent by a user terminal and used to query service information in an mDNS, into a unicast known-answer service query packet and send the unicast known-answer service query packet to the gateway, where an identity field of the unicast known-answer service query packet includes a terminal identity determined by the relay for the user terminal that sends the multicast known-answer service query packet, and receive a unicast known-answer service answer packet that is sent by the gateway and includes service information unknown to the user terminal, and convert the unicast known-answer service answer packet into a multicast known-answer service answer packet and send the multicast known-answer service answer packet to the user terminal, and the gateway is configured to obtain the terminal identity in the identity field of the unicast known-answer service query packet sent by the relay, and obtain known service information in the unicast known-answer service query packet, add, according to a saved correspondence between a terminal identity and known service information, the known service information obtained from the unicast known-answer service query packet to the gateway-saved correspondence between a terminal identity and known service information and to known service information corresponding to the terminal identity obtained from the unicast known-answer service query packet, determine, from the gateway-saved correspondence between a terminal identity and known service information, the known service information corresponding to the terminal identity obtained from the unicast known-answer service query packet, where the known service information obtained from the unicast known-answer service query packet has been added to the gateway-saved correspondence, determine all service information corresponding to a service type that is requested by the user terminal and obtained from the received unicast known-answer service query packet, obtain, after the determined known service information is removed from the determined all service information, service information that is unknown to the user terminal and corresponding to the service type requested by the user terminal corresponding to the terminal identity obtained from the unicast known-answer service query packet; and send, to the relay, the unicast known-answer service answer packet that includes the unknown service information.

In a first possible implementation manner of the fifth aspect, the terminal identity included in the identity field of the unicast known-answer service query packet is one of the following: a MAC address of the user terminal, an IP address of the user terminal, a serial number of the user terminal generated according to an address of the user terminal, and a serial number allocated by the relay to the user terminal.

With reference to the fifth aspect or the first possible implementation manner of the fifth aspect, in a second possible implementation manner of the fifth aspect, the gateway is further configured to, if the gateway-saved correspondence between a terminal identity and known service information does not include the terminal identity obtained from the unicast known-answer service query packet, establish, in the gateway-saved correspondence between a terminal identity and known service information, a correspondence between the terminal identity obtained from the unicast known-answer service query packet and the known service information obtained from the unicast known-answer service query packet.

With reference to any one of the fifth aspect, the first possible implementation manner of the fifth aspect, and the second possible implementation manner of the fifth aspect, in a third possible implementation manner of the fifth aspect, the gateway is further configured to obtain an address of the relay, where the gateway-saved correspondence between a terminal identity and known service information further includes the address of the relay.

According to a sixth aspect, a relay is provided, including: an interface and a signal processor, where the interface and the signal processor are connected to each other using a bus and transmit data using the bus. The interface is configured to receive a multicast known-answer service query packet that is sent by a user terminal and used to query service information in an mDNS, and transmit the received multicast known-answer service query packet to the signal processor. The signal processor is configured to obtain the multicast known-answer service query packet transmitted by the interface, and convert the obtained multicast known-answer service query packet into a unicast known-answer service query packet and transmit the unicast known-answer service query packet to the interface. The interface is further configured to obtain the unicast known-answer service query packet transmitted by the signal processor, and send the obtained unicast known-answer service query packet to a gateway, where the unicast known-answer service query packet includes a service type requested by the user terminal, and an identity field of the unicast known-answer service query packet includes a terminal identity determined by the relay for the user terminal that sends the multicast known-answer service query packet. The interface is further configured to receive a unicast known-answer service answer packet that is sent by the gateway and includes service information unknown to the user terminal, and transmit the unicast known-answer service answer packet to the signal processor, where the service information unknown to the user terminal is obtained by the gateway after removing, based on the terminal identity included in the received unicast known-answer service query packet, all service information known to the user terminal corresponding to the terminal identity from an established correspondence between a terminal identity and known service information. The signal processor is further configured to obtain the unicast known-answer service answer packet transmitted by the interface, convert the obtained unicast known-answer service answer packet into a multicast known-answer service answer packet, and send the multicast known-answer service answer packet to the user terminal.

In a first possible implementation manner of the sixth aspect, the terminal identity included in the identity field of the unicast known-answer service query packet sent by the interface is one of the following: a MAC address of the user terminal, an IP address of the user terminal, a serial number of the user terminal generated according to an address of the user terminal, and a serial number allocated by the relay to the user terminal.

According to a seventh aspect, a gateway is further provided, including: an interface, a memory, and a signal processor, where the interface, the memory, and the signal processor are connected to each other using a bus and transmit data using the bus. The interface is configured to receive a unicast known-answer service query packet sent by a relay, and transmit the unicast known-answer service query packet to the signal processor. The memory is configured to store program instructions, and transmit the stored program instructions to the signal processor. The signal processor is configured to obtain the program instructions stored in the memory, so as to perform the following steps: obtaining the unicast known-answer service query packet transmitted by the interface, obtaining a terminal identity in an identity field of the unicast known-answer service query packet, obtaining a service type that is requested by a user terminal and included in the unicast known-answer service query packet, and service information that is known to the user terminal and corresponding to the service type, and transmitting, to the memory, the obtained terminal identity, service type, and service information known to the user terminal. The signal processor is further configured to add, according to a correspondence, saved by the memory, between a terminal identity and known service information, the known service information obtained from the unicast known-answer service query packet to the saved correspondence between a terminal identity and known service information and to known service information corresponding to the terminal identity obtained from the unicast known-answer service query packet, and transmit an updated correspondence between a terminal identity and known service information to the memory. The signal processor is further configured to obtain the updated correspondence, transmitted by the memory, between a terminal identity and known service information, determine, from the gateway-saved correspondence between a terminal identity and known service information, the known service information corresponding to the terminal identity obtained from the unicast known-answer service query packet, where the known service information obtained from the unicast known-answer service query packet has been added to the gateway-saved correspondence, determine all service information corresponding to the service type that is requested by the user terminal and obtained from the received unicast known-answer service query packet, obtain, after the determined known service information is removed from the determined all service information, service information that is unknown to the user terminal and corresponding to the service type requested by the user terminal corresponding to the terminal identity obtained from the unicast known-answer service query packet, and transmit the unknown service information to the interface. The interface is further configured to obtain the unknown service information transmitted by the signal processor and send, to the relay, a unicast known-answer service answer packet that includes the unknown service information.

In a first possible implementation manner of the seventh aspect, the signal processor is further configured to, if the correspondence, saved by the memory, between a terminal identity and known service information does not include the terminal identity obtained from the unicast known-answer service query packet, establish, in the gateway-saved correspondence between a terminal identity and known service information, a correspondence between the terminal identity obtained from the unicast known-answer service query packet and the known service information obtained from the unicast known-answer service query packet; and transmit, to the memory for saving, the established correspondence between the terminal identity obtained from the unicast known-answer service query packet and the known service information obtained from the unicast known-answer service query packet.

With reference to the seventh aspect or the first possible implementation manner of the seventh aspect, in a second possible implementation manner of the seventh aspect, the signal processor is further configured to, after the terminal identity in the identity field of the unicast known-answer service query packet sent by the relay is obtained, obtain an address of the relay and transmit the obtained address of the relay to the memory. The memory is configured to obtain the address of the relay transmitted by the signal processor, where the saved correspondence between a terminal identity and known service information further includes the address of the relay.

In the technical solutions proposed in the embodiments of the present disclosure, a relay converts a multicast known-answer service query packet sent by a user terminal into a unicast known-answer service query packet, and then sends the unicast known-answer service query packet to a gateway, where the unicast known-answer service query packet sent to the gateway includes a terminal identity of the user terminal, a service type requested by the user terminal, and service information known to the user terminal. The gateway may distinguish, according to the terminal identity included in the received unicast known-answer service query packet, the user terminal that sends the known-answer service query packet, and then return once, according to all service information known to the same user terminal, a unicast known-answer service answer packet that includes unknown service information. The relay converts the unicast known-answer service answer packet into a multicast known-answer service answer packet and sends the multicast known-answer service answer packet to the terminal. The technical solutions proposed in the embodiments of the present disclosure implement a known-answer mechanism in an mDNS-based multi-VLAN, which reduces network bandwidth waste.

DESCRIPTION OF EMBODIMENTS

Figure 1:
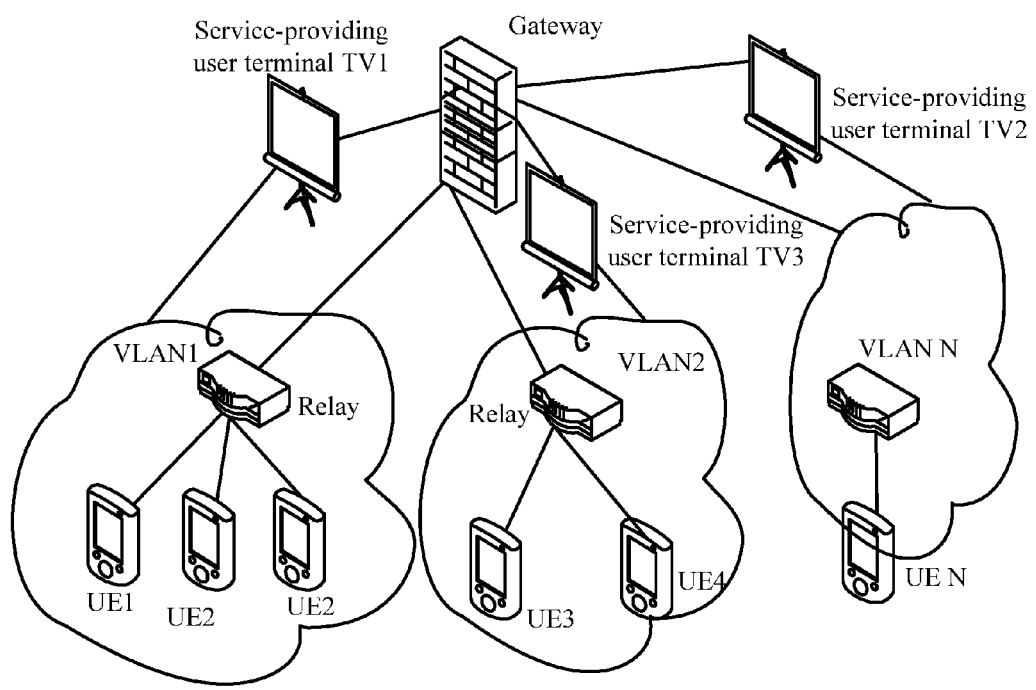
FIG. 1 is a schematic composition diagram of a system structure in which the Bonjour technology is applied in a VLAN.

To save traffic in a network that operates based on an mDNS, generally a known-answer mechanism is implemented in the mDNS. The known-answer mechanism refers to that a service-requesting user terminal sends a service query packet, where the service query packet includes known service information. When a receiver of the service query packet receives and processes the service query packet, the receiver does not need to return the known service information. The service information is information about a service-providing user terminal, includes a service type of the service-providing user terminal, such as printing, video playing, and other services, and may further include information such as an identity of the service-providing user terminal. The identity of the service-providing user terminal may be an address, in a network, of the service-providing user terminal, or a service name corresponding to the service type provided by the service-providing user terminal. However, if the known-answer mechanism is simply applied to a multi-VLAN in which the Bonjour technology is applied, a network bandwidth waste problem cannot be resolved. For example, if a service-requesting user terminal has much known service information, the user terminal needs to send multiple multicast-form service query packets to notify a receiver (such as a gateway) of the known service information. However, in a network that operates based on an mDNS, after a service request packet sent by a user terminal is processed by a relay, a source address of the packet is replaced with an address of the relay, and then the packet is sent to a gateway. Therefore, the gateway cannot distinguish, according to the source address in the packet, a user terminal from which the service request packet comes, and therefore, the gateway responds to, for multiple batches, multiple service request packets sent by the same user terminal, so that there is a great waste of network bandwidth if the gateway stores much service information.

To resolve a problem that generally network bandwidth is wasted because many answer packets need to be transmitted when a known-answer mechanism is implemented in an mDNS-based network, in the technical solutions proposed in the present disclosure, a relay converts a multicast known-answer service query packet sent by a user terminal into a unicast known-answer service query packet, and then sends the unicast known-answer service query packet to a gateway, where the unicast known-answer service query packet sent to the gateway includes a terminal identity of the user terminal. The gateway may distinguish, according to the terminal identity included in the received unicast known-answer service query packet, all known-answer service query packets sent by the same user terminal, and then returns once a unicast known-answer service answer packet that includes service information. The relay converts the unicast known-answer service answer packet into a multicast known-answer service answer packet and sends the multicast known-answer service answer packet to the terminal, so as to resolve the problem that generally network bandwidth is wasted because much service information needs to be transmitted when a known-answer mechanism is implemented in an mDNS-based network.

The following expounds main implementation principles of the technical solutions in embodiments of the present disclosure, specific implementation manners thereof, and corresponding accomplishable beneficial effects with reference to the accompanying drawings.

In solutions proposed in the embodiments of the present disclosure, a mentioned user terminal refers to a user terminal supporting Bonjour, which is referred to as a user terminal for short in the following for brevity of description.

Embodiment 1

Embodiment 1 of the present disclosure proposes a packet transmission system in a mDNS, where a known-answer mechanism is introduced into a multi-VLAN in which the Bonjour technology is applied. For a system architecture of the packet transmission system, refer to FIG. 1. The system includes at least one relay, and each relay of the at least one relay may be connected to a user terminal/equipment (UEs in FIG. 1) in a wired or wireless manner. A relay and a user terminal connected to the relay are located in a same VLAN, and each VLAN has only one relay while one relay may be configured in different VLANs. To implement the known-answer mechanism, a gateway receives and records a terminal identity of a user terminal in a service query packet that is sent by the user terminal and forwarded by a relay in each VLAN, performs corresponding processing according to the received service query packet, and sends a processing result to the relay using a service answer packet. The relay forwards the service answer packet to the user terminal. When a service-requesting user terminal and a service-providing user terminal are located in different VLANs, both the service-requesting user terminal and the service-providing user terminal access the gateway using relays in VLANs in which the service-requesting user terminal and the service-providing user terminal are respectively located.

In the technical solution proposed in Embodiment 1 of the present disclosure, when a known-answer mechanism is applied to an mDNS, a user terminal sends, in a VLAN in which the user terminal itself is located, a multicast known-answer service query packet used to notify service information known to the user terminal itself. The service information is information about a service-providing user terminal, includes a service type of the service-providing user terminal, such as printing, video playing, and other services, and may further include information such as an identity of the service-providing user terminal. The identity of the service-providing user terminal may be an address, in a network, of the service-providing user terminal, or a service name corresponding to the service type provided by the service-providing user terminal. A relay in a same VLAN as the user terminal receives the multicast known-answer service query packet that is sent by the user terminal and requests a service type. The relay acquires a source address of the received multicast known-answer service query packet sent by the user terminal, and the relay determines a terminal identity (ID) of the user terminal according to the source address. The terminal identity of the user terminal that is determined by the relay may be a MAC address of the user terminal, may be an IP address of the user terminal, may be a value that can identify the user terminal and is generated according to an address of the user terminal, such as a MAC address, an IP address, or a combination thereof, or may also be a serial number allocated by the relay to the user terminal sequentially or randomly. If the terminal identity of the user terminal is a serial number allocated by the relay to the user terminal, the relay saves a correspondence between the serial number allocated to the user terminal and an address of the user terminal. If the source address of the received multicast known-answer service query packet is the address existing in the correspondence, the relay determines that the serial number that is in the correspondence and corresponding to the source address of the received multicast known-answer service query packet is the terminal identity of the user terminal.

The relay includes the determined terminal identity into a unicast known-answer service query packet and sends the unicast known-answer service query packet to a gateway. The unicast known-answer service query packet is formed after the relay converts the received multicast known-answer service query packet sent by the user terminal.

Furthermore, the relay replaces the source address of the received multicast known-answer service query packet sent by the user terminal with an address of the relay, replaces a destination address of the received multicast known-answer service query packet sent by the user terminal with an address of the gateway, and writes the determined terminal identity into an identity field of the multicast known-answer service query packet, so as to form the unicast known-answer service query packet. The address of the user terminal may be an IP address, in a network, of the user terminal, the address of the relay may be an IP address, in the network, of the relay, and the address of the gateway may be an IP address, in the network, of the gateway.

The relay sends, to the gateway, the formed unicast known-answer service query packet that includes the terminal identity. Therefore, the unicast known-answer service query packet includes the terminal identity determined by the relay for the user terminal that sends the multicast known-answer service query packet, and the service information known to the user terminal.

The gateway receives the unicast known-answer service query packet sent by the relay, obtains the terminal identity in the received unicast known-answer service query packet, and obtains a service type that is requested by the user terminal and in the unicast known-answer service query packet, and the service information that is known to the user terminal and corresponding to the service type requested by the user terminal. The gateway saves a correspondence between the terminal identity obtained from the unicast known-answer service query packet and the service information known to the user terminal corresponding to the terminal identity. That is, if the terminal identity in the unicast known-answer service query packet is not in a gateway-saved correspondence between a terminal identity and known service information, the gateway establishes, in the saved correspondence between a terminal identity and known service information, the correspondence between the terminal identity obtained from the unicast known-answer service query packet and the service information known to the user terminal corresponding to the terminal identity. If the terminal identity in the unicast known-answer service query packet is in the gateway-saved correspondence between a terminal identity and known service information, the gateway adds, to the saved correspondence, the correspondence of the service information known to the user terminal corresponding to the terminal identity.

Optionally, when establishing a correspondence between an obtained terminal identity and service information known to a user terminal corresponding to the terminal identity, the gateway may establish a correspondence among an address of a relay that sends a unicast known-answer service query packet, the terminal identity, and the corresponding known service information. The address of the relay may be an IP address, in a network, of the relay or another address that can uniquely identify the relay. In an example that the address of the relay is an IP address, in a network, of the relay and the terminal identity is a serial number allocated by the relay to the user terminal sequentially or randomly, further, refer to the following Table 1 for an established correspondence among an address of a relay, a terminal identity, and corresponding known service information.

TABLE 1

| IP address of a relay | Terminal identity | Known service information |
|---|---|---|
| 10.1.1.2 | ID1 | Service information 1 |
|  |  | Service information 2 |
| 10.1.1.3 | ID2 | Service information 1 |
|  |  | Service information 2 |
|  |  | Service information 4 |
| . . . | . . . | . . . |

If the terminal identity is a serial number allocated by a relay to the user terminal, to avoid that the gateway confuses user terminals because serial numbers allocated by different relays are duplicate, the gateway establishes the correspondence among an address of a relay, a terminal identity, and corresponding known service information, so as to distinguish serial numbers allocated by different relays. However, in the case in which the terminal identity is a serial number allocated by a relay to the user terminal, it is not necessarily to use the foregoing mechanism to avoid confusion. For example, relays may notify each other of used serial numbers, or serial number pools of unduplicated and allocable serial numbers are configured in different relays.

If there is much service information known to the user terminal, the user terminal sends the known service information in multiple batches, where a specific processing procedure is as follows:

The user terminal sends again, in the VLAN in which the user terminal is located, a multicast known-answer service query packet used to query service information in the mDNS.

The relay in the same VLAN as the user terminal receives the multicast known-answer service query packet that is used to query the service information in the mDNS and sent again by the user terminal, the relay determines an address in the received multicast known-answer service query packet sent by the user terminal, and the relay determines the terminal identity of the user terminal. The relay replaces a source address in the multicast known-answer service query packet with the address of the relay, replaces a destination address in the multicast known-answer service query packet with the address of the gateway, so as to form a unicast known-answer service query packet, and sends the unicast known-answer service query packet to the gateway. Therefore, the unicast known-answer service notification packet includes the terminal identity determined by the relay for the user terminal that sends the multicast known-answer service query packet, a service type requested by the user terminal, and known service information corresponding to the service type requested by the user terminal.

The gateway receives the unicast known-answer service query packet sent by the relay, obtains the terminal identity from the received unicast known-answer service query packet sent by the relay, obtains the service type requested by the user terminal, and obtains the service information known to the user terminal. According to the obtained terminal identity, in the established correspondence between a terminal identity and known service information, it is determined whether a same terminal identity is stored in the correspondence between a terminal identity and known service information. If a same terminal identity is stored, the service information that is known to the user terminal and is obtained from the unicast known-answer service query packet sent by the relay is added to the correspondence between a terminal identity and known service information. If the currently obtained terminal identity is not stored in the correspondence between a terminal identity and known service information, the gateway establishes a correspondence between the terminal identity and the known service information that are obtained from the unicast known-answer service query packet sent by the relay. After obtaining all service information known to the user terminal, the gateway removes the known service information corresponding to terminal identity of the user terminal from all service information corresponding to the service type requested by the user terminal, so as to obtain service information unknown to the user terminal corresponding to the terminal identity, and sends the unknown service information to the relay using a unicast known-answer service answer packet. The foregoing all service information is all service information known to the gateway.

After receiving the unicast known-answer service answer packet that includes the service information unknown to the user terminal and is sent by the gateway, the relay changes an address in the received unicast known-answer service answer packet to a multicast address in the mDNS so as to obtain a multicast known-answer service answer packet that includes the service information unknown to the user terminal, and sends the obtained multicast known-answer service answer packet to the user terminal. Subsequently, the user terminal may obtain the service information unknown to the user terminal according to the multicast known-answer service answer packet.

Figure 2:
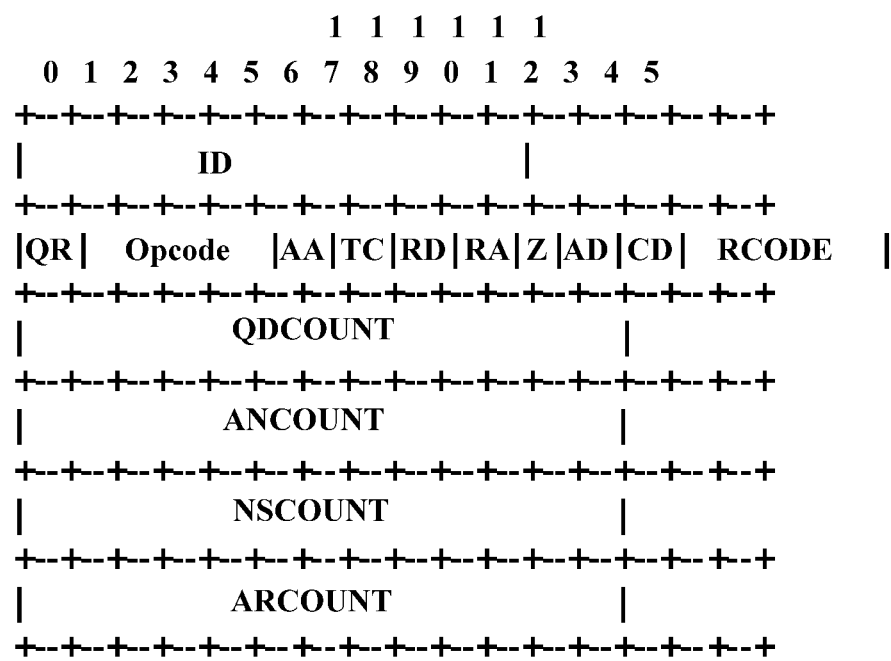
FIG. 2 is a schematic structural diagram of a header of a multicast packet proposed in Embodiment 1 of the present disclosure.

In the mDNS protocol, a header structure of a multicast packet is shown in FIG. 2, and includes an identity field (the ID field shown in FIG. 2), a QDCOUNT field, an ANCOUNT field, an NSCOUNT field, and an ARCOUNT field. To ensure that all user terminals in a same VLAN can receive a multicast packet sent by a relay in the VLAN and obtain included service information from the received multicast packet, zeros need to be written into the ID field as specified in the request for comments (RFC) protocol 6762. However, in the foregoing proposed technical solution in Embodiment 1 of the present disclosure, improvements are made based on the existing mDNS protocol. During transmission of a multicast packet, an ID field of the multicast packet may be modified, a terminal identity of a user terminal is written into the ID field, a value of the ID field is used to distinguish the user terminal, and the value of the ID field, that is, the terminal identity of the user terminal, and known service information are correspondingly stored in the gateway. Therefore, the known-answer mechanism is implemented in an inter-VLAN scenario, so that transmission resources in an mDNS-based network are saved.

Figure 3:
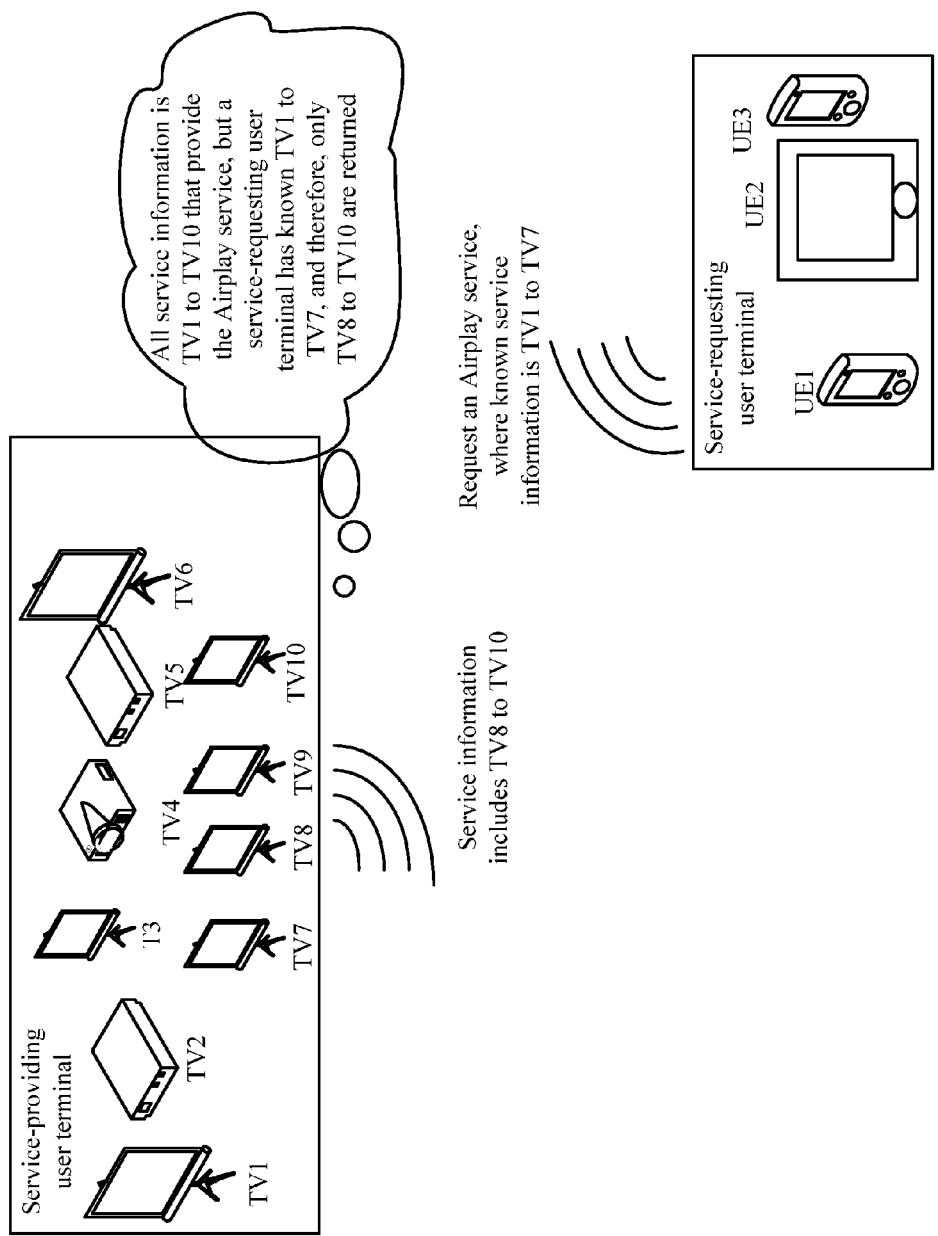
FIG. 3 is a schematic diagram of a working principle of a known-answer mechanism proposed in Embodiment 1 of the present disclosure.

An example is used for detailed description. As shown in FIG. 3, it is assumed that an identity of a user terminal is UE1, and a service type that UE1 requests to query is service information of airplay. Airplay is a service, in the Bonjour technology, where a service-requesting user terminal finds a user terminal having a capability of providing video playing, and the service-requesting user terminal, using the user terminal having the capability of providing video playing, plays a video on the user terminal having a capability of providing video playing. As shown in FIG. 3, for example, service information related to airplay service providing is TV1 to TV10, where TV1 to TV10 are service names of user terminals providing the airplay service. That is, all user terminals whose service names are TV1 to TV10 can provide the airplay service. In an mDNS-based network into which a known-answer mechanism is introduced, when UE1 sends an airplay service query packet whose packet receiving address is a multicast address (for ease of description, an airplay service query packet whose packet receiving address is a multicast address may be referred to as a multicast airplay service query packet for short), the multicast airplay service query packet includes service information that is already known to UE1 and can provide an airplay service type. For example, the service information known to UE1 is TV1 to TV7. Because there is much known service information, UE1 needs to send the service information in two batches. For example, in the first batch, the user terminal UE1 sends a multicast airplay service query packet that includes service information TV1 to TV4. A relay determines a terminal identity of the user terminal UE1, for example, a MAC address of the user terminal, and converts the received multicast airplay service query packet into a unicast airplay service query packet (for ease of description, an airplay service query packet whose packet receiving address is a unicast address may be referred to as a unicast airplay service query packet for short). Then, the relay sends, to a gateway, the unicast airplay service query packet that includes the MAC address of the user terminal UE1 and the service type requested by the user terminal UE1. After receiving the unicast airplay service query packet, the gateway processes the received unicast airplay service query packet and obtains the terminal identity, the service type requested by the user terminal UE1, and the service information that is known to the user terminal UE1 and corresponding to the service type requested by UE1, which are in the unicast airplay service query packet. The gateway obtains, in the first batch, the terminal identity of the user terminal and the service information known to the user terminal UE1, and the gateway establishes a correspondence between the terminal identity and the service information that is known to the user terminal UE1 and corresponding to the service type requested by UE1.

The user terminal UE1 has sent the multicast known-answer service query packet that includes service information TV1 to TV4, and the gateway has recorded the correspondence between the MAC address of the user terminal UE1 and the service information TV1 to TV4 known to the user terminal UE1. Therefore, in the second batch, the user terminal UE1 sends a multicast known-answer service query packet that includes service information TV5 to TV7.

The relay receives the multicast known-answer service query packet that is sent again by the user terminal UE1 and includes the service information TV5 to TV7. The relay determines the MAC address of the user terminal UE1 in the multicast known-answer service query packet, converts the received multicast known-answer service query packet that includes the service information TV5 to TV7 into a unicast known-answer service query packet, and sends the unicast known-answer service query packet to the gateway. The sent unicast known-answer service query packet includes the MAC address of the user terminal UE1.

Because the user terminal UE1 sends the known service information in two batches, for the gateway, the gateway receives a total of two unicast known-answer service query packets that are sent by the relay and include the MAC address of the user terminal UE1. The gateway obtains the MAC address of the user terminal UE1 and the service information (such as TV1 to TV4 described above) known to the user terminal from the received unicast known-answer service query packet sent by the relay in the first batch, and establishes the correspondence between the MAC address of the user terminal UE1 and the service information known to the user terminal UE1. The gateway obtains the MAC address of the user terminal UE1 and the service information (such as TV5 to TV7 described above) known to the user terminal UE1 from the unicast known-answer service query packet sent by the relay in the second batch. Because the same MAC address has been stored, the gateway adds the service information TV5 to TV7 to the established and known correspondence between the MAC address and the user terminal UE1. In this way, the user terminal UE1 sends two multicast known-answer service query packets, so that the gateway completely learns all service information known to the user terminal UE1. According to the known-answer mechanism, if there are 10 pieces of service information TV1 to TV10 in total, the gateway needs to include only service information TV8 to TV10 into a unicast known-answer service answer packet and send the unicast known-answer service answer packet to the relay, because the service information TV1 to TV7 is already known to UE1.

After receiving a unicast known-answer service answer packet that is sent by the gateway and includes the service information TV8 to TV10 unknown to the user terminal, the relay changes an address in the received unicast known-answer service answer packet to a multicast address in an mDNS so as to obtain a multicast known-answer service answer packet that includes the service information unknown to the user terminal, and sends the obtained multicast known-answer service answer packet to the user terminal. Subsequently, the user terminal may learn all the service information TV1 to TV10 in the network according to the multicast known-answer service answer packet. In the 10 pieces of service information, the service information known to the user terminal UE1 is TV1 to TV7, and the service information notified by the gateway is TV8 to TV10.

In the foregoing technical solution proposed in Embodiment 1 of the present disclosure, when a known-answer mechanism is implemented in an mDNS, a gateway establishes a correspondence between an obtained terminal identity and service information known to a user terminal according to a received unicast known-answer service query packet. During subsequent implementation of the known-answer mechanism, if there is much service information known to the user terminal, although the user terminal sends several known-answer service query packets to notify the service information known to the user terminal itself, the gateway may perform, after learning all service information known to the user terminal, corresponding processing and notify the user terminal of unknown service information because the correspondence between the terminal identity and service information known to the user terminal is already established in the gateway. Therefore, network transmission resources can be better saved.

Embodiment 2

Figure 4:
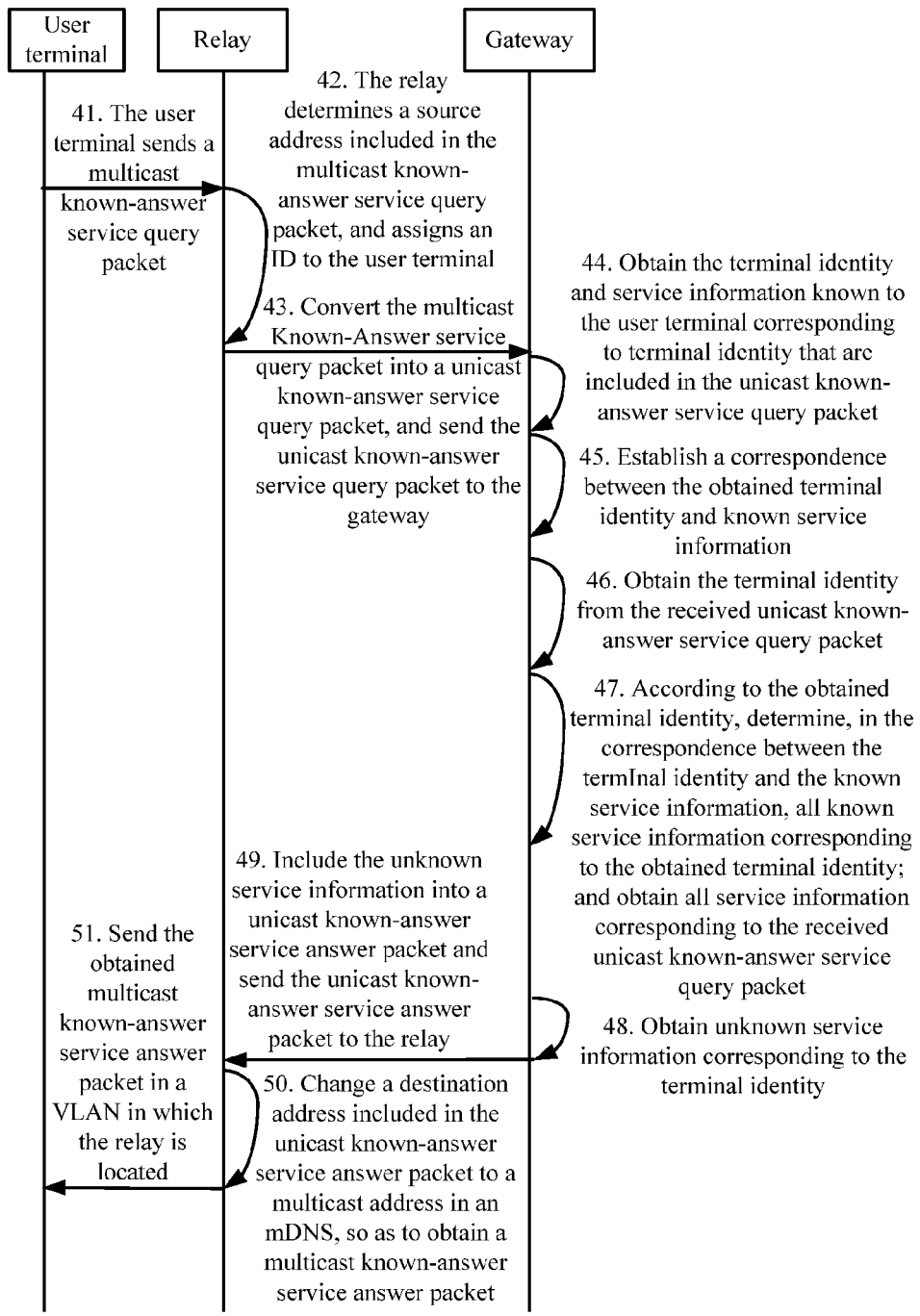
FIG. 4 is a flowchart of a packet transmission method in an mDNS proposed in Embodiment 2 of the present disclosure.

Based on the system architecture shown in FIG. 1, Embodiment 2 of the present disclosure proposes a packet transmission method in an mDNS. As shown in FIG. 4, a specific processing procedure of the packet transmission method in an mDNS is as follows:

Step 41: A user terminal sends, in a VLAN in which the user terminal itself is located, a multicast known-answer service query packet of service information.

Detailed description is provided using the user terminal UE1 shown in FIG. 1 as an example. UE1 sends, in a VLAN in which UE1 itself is located, a multicast known-answer service query packet used to notify service information known to UE1 itself. The service information includes a terminal identity of a user terminal that can provide a service, a service name of the user terminal that can provide a service, and a service type provided by the user terminal, such as printing and video playing. UE1 requests to query airplay service information. Service information that is known to UE1 and can provide an airplay service is TV1 to TV3, respectively. UE1 may notify the service information known to itself piece by piece by sending multiple multicast known-answer service query packets, or may include all service information TV1, TV2, and TV3 known to itself into one multicast known-answer service query packet. In Embodiment 2 of the present disclosure, the user terminal UE1 sends two multicast known-answer service query packets to notify the known service information TV1, TV2, and TV3. It is assumed that the first multicast known-answer service query packet includes the service information TV1 and TV2 known to UE1, and the second multicast known-answer service query packet includes the service information TV3 known to UE1.

Step 42: A relay determines an address in the received multicast known-answer service query packet sent by the user terminal, and determines a terminal identity of the user terminal according to the obtained address.

In the system architecture shown in FIG. 1, a relay connected to the user terminal UE1 successively receives two multicast known-answer service query packets sent by the user terminal UE1. In Embodiment 2 of the present disclosure, it is assumed that addresses in the two multicast known-answer service query packets are an IP address, in a network, of UE1. The relay determines an ID for the user terminal, where the determined ID may a MAC address of the user terminal UE1, or may be an address of the relay and a serial number of UE1 in the VLAN in which the user terminal UE1 is located. In this step, an example that the determined ID is a MAC address is used for description. This condition continues to be referenced in the following description.

Step 43: The relay converts the multicast known-answer service query packet into a unicast known-answer service query packet, and sends the unicast known-answer service query packet to a gateway.

Because the relay processes, in a same manner, the multicast known-answer service query packets sent by the user terminal, in this step, an example that the relay processes only one received multicast known-answer service query packet sent by the user terminal is used for description.

In the foregoing step 42 to step 43, the relay in a same VLAN as UE1 receives the multicast known-answer service query packet sent by UE1, the relay determines the address in the received multicast known-answer service query packet sent by UE1, and the relay determines the ID of UE1, includes the determined ID into a converted unicast known-answer service query packet, and sends the unicast known-answer service query packet to the gateway. That the relay converts the received multicast known-answer service query packet into a unicast known-answer service query packet is as follows: First, the determined address in the multicast known-answer service query packet is replaced with the address of the relay, and the determined address in the multicast known-answer service query packet is replaced with an address of the gateway, so as to form a unicast known-answer service query packet. The unicast known-answer service query packet is then sent to the gateway. That is, the sent unicast known-answer service query packet includes the terminal identity determined for the user terminal that sends the multicast known-answer service query packet, and the service information known to the user terminal.

Step 44: The gateway receives the unicast known-answer service query packet sent by the relay, and obtains the terminal identity and service information known to the user terminal corresponding to the terminal identity that are included in the received unicast known-answer service query packet.

Step 45: The gateway establishes a correspondence between the obtained terminal identity and the service information known to the user terminal corresponding to the terminal identity according to the obtained terminal identity and the service information known to the user terminal corresponding to the terminal identity.

The user terminal UE1 sends the service information to the relay using two multicast known-answer service query packets, and then the relay converts the two multicast known-answer service query packets respectively into two unicast known-answer service query packets and sends the two unicast known-answer service query packets to the gateway. Therefore, when receiving the first unicast known-answer service query packet, the gateway obtains the MAC address of UE1 that is carried in the first unicast known-answer service query packet, and the service information TV1 and TV2 known to UE1, establishes a correspondence between the MAC address of UE1 and the service information TV1 and TV2 known to UE1. When receiving the second unicast known-answer service query packet, the gateway obtains the MAC address of UE1 that is carried in the second unicast known-answer service query packet, and service information TV3 known to UE1. Because the gateway has established the correspondence between the MAC address of UE1 and the service information TV1 to TV2 known to UE1, in this case, the gateway adds the service information TV3 known to UE1 into the correspondence, that is, when receiving the second unicast known-answer service query packet, the gateway establishes a correspondence between the MAC address of the user terminal UE1 and the service information TV1 to TV3 known to UE1.

In an implementation manner, when establishing a correspondence between an obtained terminal identity and service information known to a user terminal corresponding to the terminal identity, a gateway may establish a correspondence among an address of a relay that sends a unicast known-answer service query packet, a terminal identity, and corresponding known service information. The address of the relay may be an IP address. For details, refer to the foregoing Table 1. Details are not provided in this step again.

If the terminal identity is a serial number allocated by a relay to the user terminal, to avoid that the gateway confuses user terminals because serial numbers allocated by different relays are duplicate, the gateway establishes the correspondence among an address of a relay, a terminal identity, and corresponding known service information, so as to distinguish serial numbers allocated by different relays. However, in the case in which the terminal identity is a serial number allocated by a relay to the user terminal, it is not necessarily to use the foregoing mechanism to avoid confusion. For example, relays may notify each other of used serial numbers, or a serial number pool of unduplicated and allocable serial numbers is configured in different relays.

In the foregoing step 41 to step 45, if there is much service information known to the user terminal, although the user terminal sends several known-answer service query packets to notify the service information known to the user terminal itself, because the gateway has established the correspondence between the terminal identity and the service information known to the user terminal, the gateway may give a corresponding answer after learning all service information known to the user terminal, so as to notify the user terminal of unknown service information, thereby better saving network transmission resources.

Step 46: After establishing the correspondence between the terminal identity and the service information known to the user terminal, the gateway obtains the terminal identity from the received unicast known-answer service query packet sent by the relay.

Step 47: According to the obtained terminal identity, the gateway determines, in the established correspondence between the terminal identity and the service information known to the user terminal, all known service information corresponding to the obtained terminal identity, and the gateway obtains all service information corresponding to the unicast known-answer service query packet.

Figure 5:
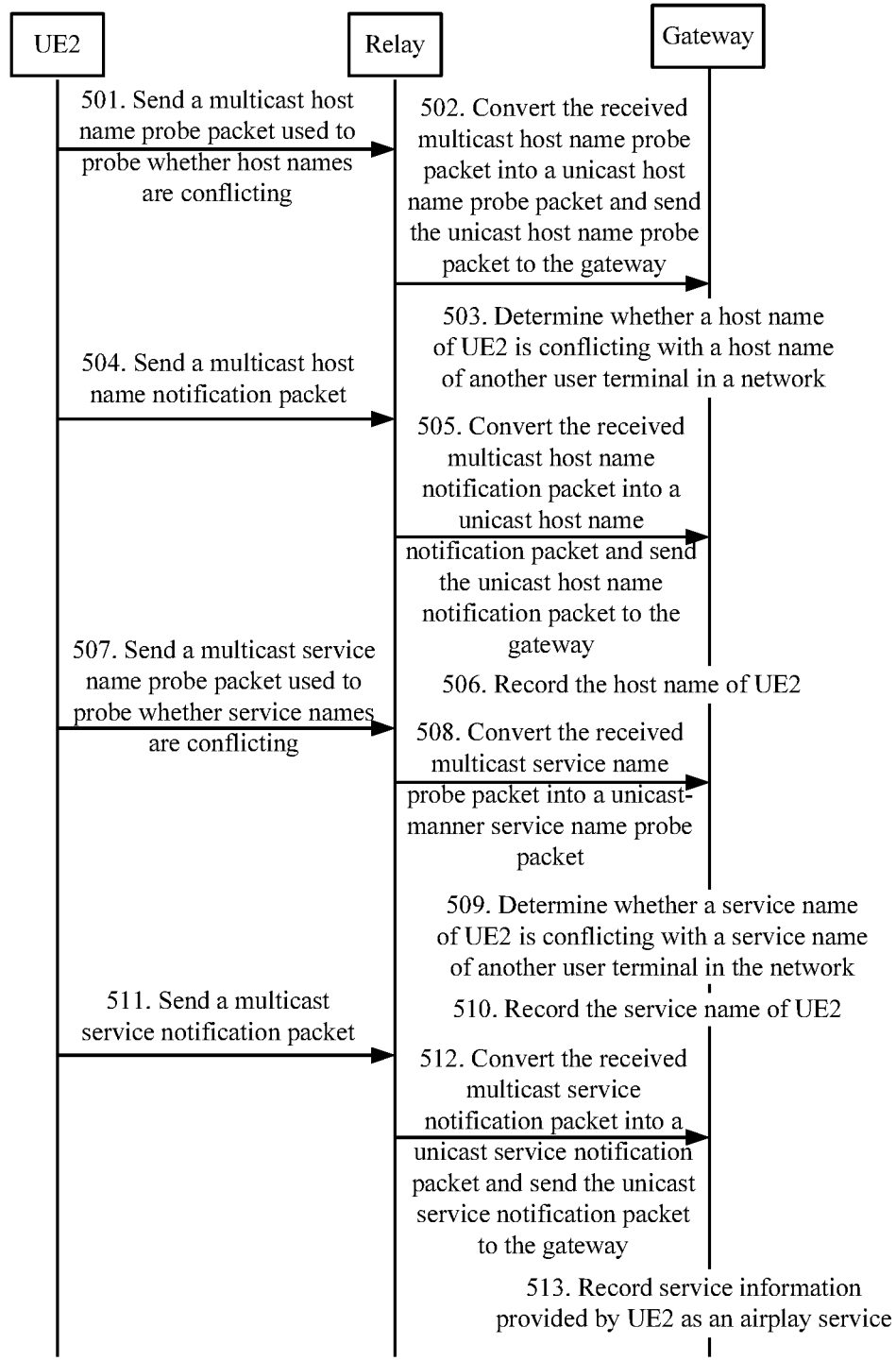
FIG. 5 is a flowchart of a method, in the Bonjour technology, for obtaining service information by a gateway.

The implementation manner in which all service information that is obtained by the gateway and corresponding to the received unicast known-answer service query packet may be reported in a system establishment process by a service-providing user terminal, or may be related service information recorded by the gateway when a service-providing user terminal is being added to the system. Embodiment 2 of the present disclosure provides a processing procedure of obtaining all service information in a network by a gateway. For ease of description, a service-requesting user terminal is referred to as a client and is indicated by UE1, and a service-providing user terminal is referred to as a server and is indicated by UE2, where a host name that identifies UE2 itself and a service name of service information provided by UE2 are set on UE2. It is assumed that UE1 and UE2 are in different VLANs. Furthermore, as shown in FIG. 5, a specific processing procedure is as follows:

Step 501: After UE2 is added to the system, UE2 sends, in a multicast manner, a host name probe packet used to probe whether host names are conflicting.

The host name probe packet includes a destination address that is a multicast address and a source address of UE2 that sends the probe packet, and therefore the host name probe packet sent in a multicast manner may also be referred to as a multicast host name probe packet.

Step 502: A relay disposed in a same VLAN as UE2 converts the received host name probe packet into a unicast-manner host name probe packet, and then sends the converted unicast-manner host name probe packet to a gateway.

The relay disposed in the same VLAN as UE2, receives the multicast-manner host name probe packet sent by UE2, and replaces the source address and the destination address in the host name probe packet. Furthermore, the source address in the host name probe packet is replaced with an address of the relay, the destination address in the host name probe packet is replaced with an address of the gateway, and then the host name probe packet is sent to the gateway. The host name probe packet sent in a unicast manner may also be referred to as a unicast host name probe packet.

Step 503: After receiving the unicast host name probe packet, the gateway processes the received unicast host name probe packet and determines whether a host name of UE2 is conflicting with a host name of another user terminal in a network.

Step 504: When the gateway determines that the host name of UE2 is not conflicting with a host name of another user terminal that is in the network and used to provide a service, UE2 sends, in a multicast manner in the VLAN in which UE2 is located, a host name notification packet for notifying the host name of UE2.

The host name notification packet, sent in a multicast manner, for notifying the host name of UE2 may also be referred to as a multicast host name notification packet.

Step 505: The relay disposed in the same VLAN as UE2 converts the received multicast-manner host name notification packet into a unicast-manner host name notification packet, and sends the unicast-manner host name notification packet to the gateway.

Furthermore, for a specific implementation manner of converting, by the relay, the received multicast-manner host name notification packet into the unicast-manner host name notification packet, refer to the detailed description in step 502. Details are not provided in this step again.

Step 506: After receiving the unicast-manner host name notification packet, the gateway records the host name of UE2.

Step 507: UE2 sends, in a multicast manner, a service name probe packet for probing whether service names are conflicting.

The service name probe packet includes the source address and the destination address of UE2 that sends the service name probe packet. The service name probe packet, sent in a multicast manner, for probing whether service names are conflicting may also be referred to as a multicast service name probe packet.

Step 508: The relay disposed in the same VLAN as UE2 converts the received multicast-manner service name probe packet into a unicast-manner service name probe packet, and then sends the converted unicast-manner service name probe packet to the gateway.

The relay converts the received multicast service name probe packet into the unicast-manner service name probe packet (which may also be referred to as a unicast service name probe packet), and then sends the unicast service name probe packet to the gateway. For a specific implementation manner of converting, by the relay, the received multicast service name probe packet into a unicast service name probe packet, refer to the detailed description in step 502. Details are not provided in this step again.

Step 509: After receiving the service name probe packet, the gateway processes the received service name probe packet and determines whether a service name of UE2 is conflicting with a service name of another user terminal in the network.

Step 510: When determining that the service name of UE2 is not conflicting with a service name of another user terminal in the network, the gateway records the service name of UE2.

Step 511: UE2 sends, in the VLAN in which UE2 is located, a multicast service notification packet for notifying that service information of UE2 itself is an airplay service.

Step 512: The relay disposed in the same VLAN as UE2 converts the received multicast service notification packet into a unicast service notification packet, and sends the unicast service notification packet to the gateway.

Furthermore, for a specific implementation manner of converting, by the relay, the received multicast-form packet into a unicast-form packet, refer to the detailed description in step 502. Details are not provided in this step again.

Step 513: After receiving the unicast service notification packet, the gateway records the service information provided by UE2 as the airplay service.

In an implementation manner, the gateway may establish a correspondence among the host name of UE2, the service name of UE2, and the service information provided by UE2.

Step 48: The gateway removes the known service information corresponding to the obtained terminal identity from the obtained all service information, so as to obtain unknown service information corresponding to the terminal identity.

It is assumed that all the service information obtained by the gateway is TV1 to TV10, and the service information known to UE1 in the gateway-established correspondence between the terminal identity and the known service information is TV1 to TV3. Therefore, it may be learned that the service information unknown to UE1 is TV4 to TV10.

Step 49: The gateway sends, to the relay, a unicast known-answer service answer packet that includes the service information unknown to the user terminal.

The gateway sends, to the relay, a unicast known-answer service answer packet that includes the service information TV4 to TV10 unknown to the user terminal.

Step 50: After receiving the unicast known-answer service answer packet sent by the gateway, the relay changes a destination address included in the unicast known-answer service answer packet to a multicast address in an mDNS, so as to obtain a multicast known-answer service answer packet.

Step 51: Send the obtained multicast known-answer service answer packet in the VLAN in which the relay is located.

In the foregoing step 50 to step 51, the relay may change the destination address included in the unicast known-answer service answer packet to 224.0.0.251, and then sends the multicast known-answer service answer packet, so that a user terminal can learn all service information in the network according to the multicast known-answer service answer packet.

In the mDNS protocol, a header structure of a multicast packet is shown in FIG. 2, and includes an identity field (the ID field shown in FIG. 2), a QDCOUNT field, an ANCOUNT field, an NSCOUNT field, and an ARCOUNT field.

In the foregoing technical solution proposed in Embodiment 2 of the present disclosure, improvements are made based on the existing mDNS protocol. During transmission of a multicast packet, an ID field of the multicast packet may be modified, a terminal identity of a user terminal is written into the ID field, a value of the ID field is used to distinguish the user terminal, and the value of the ID field, that is, the terminal identity of the user terminal, and known service information are correspondingly stored in a gateway. Therefore, a known-answer mechanism is implemented in an inter-VLAN scenario, so that transmission resources in an mDNS-based network are saved.

The foregoing packet transmission method process in an mDNS proposed in Embodiment 2 of the present disclosure is merely an implementation manner. During specific implementation, it may be that when needing to query service information, a user terminal sends a multicast known-answer service query packet to trigger a gateway to establish a correspondence between a terminal identity and known service information. It may also be that the user terminal regularly sends multicast known-answer service query packets to notify the gateway of service information known to the user terminal itself.

Embodiment 3

Figure 6:
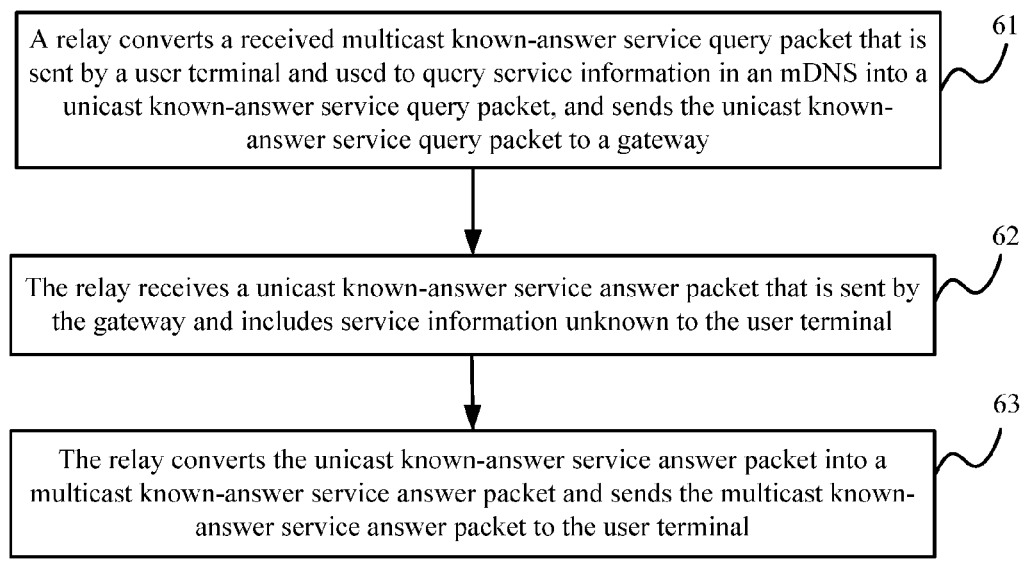
FIG. 6 is a flowchart of a proposed packet transmission method in an mDNS in Embodiment 3 of the present disclosure, where the method is applied on a relay side.

Correspondingly, for a relay in a system, when the method is implemented, as shown in FIG. 6, a specific processing procedure is as follows:

Step 61: A relay converts a received multicast known-answer service query packet that is sent by a user terminal and used to query service information in an mDNS into a unicast known-answer service query packet, and sends the unicast known-answer service query packet to a gateway.

The unicast known-answer service query packet may include a service type requested by the user terminal or may not include a service type requested by the user terminal. An identity field of the unicast known-answer service query packet includes a terminal identity determined by the relay for the user terminal that sends the multicast known-answer service query packet.

The relay receives the multicast known-answer service query packet that is sent by the user terminal and used to query service information in the mDNS, the relay determines a source address of the received multicast known-answer service query packet sent by the user terminal. Then the relay determines an ID for the user terminal according to the determined source address, writes the determined ID into an identity field of the multicast known-answer service query packet, replaces the determined source address in the multicast known-answer service query packet with an address of the relay, and replaces a determined destination address in the multicast known-answer service query packet with an address of the gateway, so as to form a unicast known-answer service query packet and send the unicast known-answer service query packet to the gateway.

Furthermore, for a specific implementation manner of converting, by the relay, the received multicast known-answer service query packet into a unicast known-answer service query packet, refer to the detailed description in the foregoing Embodiment 1 and Embodiment 2. Details are not provided in Embodiment 3 of the present disclosure again.

Further, the terminal identity included in the identity field of the unicast known-answer service query packet is one of the following:

A: a MAC address of the user terminal;
B: an IP address of the user terminal;
C: a serial number of the user terminal generated according to an address of the user terminal; and
D: a serial number allocated by the relay to the user terminal.

Step 62: The relay receives a unicast known-answer service answer packet that is sent by the gateway and includes service information unknown to the user terminal.

The service information unknown to the user terminal is obtained by the gateway after removing, based on the terminal identity included in the received unicast known-answer service query packet, all service information known to the user terminal corresponding to the terminal identity from an established correspondence between a terminal identity and known service information.

Step 63: The relay converts the unicast known-answer service answer packet into a multicast known-answer service answer packet and sends the multicast known-answer service answer packet to the user terminal.

Figure 7:
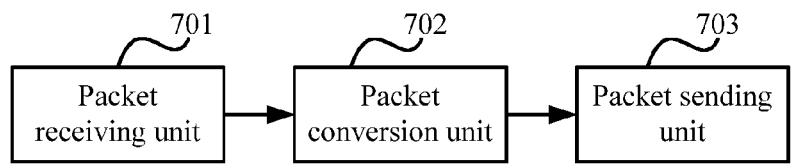
FIG. 7 is a schematic structural composition diagram of a packet transmission apparatus in an mDNS proposed in Embodiment 3 of the present disclosure.

Correspondingly, Embodiment 3 of the present disclosure further proposes a packet transmission apparatus in an mDNS, where a structural composition of the apparatus is shown in FIG. 7, and the apparatus includes: a packet receiving unit 701 configured to receive a multicast known-answer service query packet that is sent by a user terminal and used to query service information in an mDNS, and transmit the received multicast known-answer service query packet to a packet conversion unit 702, the packet conversion unit 702 configured to obtain the multicast known-answer service query packet transmitted by the packet receiving unit 701, convert the obtained multicast known-answer service query packet into a unicast known-answer service query packet, and transmit the unicast known-answer service query packet to a packet sending unit 703, and the packet sending unit 703 configured to obtain the unicast known-answer service query packet transmitted by the packet conversion unit 702, and send the obtained unicast known-answer service query packet to a gateway, where an identity field of the unicast known-answer service query packet includes a terminal identity determined by the relay for the user terminal that sends the multicast known-answer service query packet.

The packet receiving unit 701 is further configured to receive a unicast known-answer service answer packet that is sent by the gateway and includes service information unknown to the user terminal, and transmit the unicast known-answer service answer packet to the packet conversion unit 702, where the service information unknown to the user terminal is obtained by the gateway after removing, based on the terminal identity included in the received unicast known-answer service query packet, all service information known to the user terminal corresponding to the terminal identity from an established correspondence between a terminal identity and known service information.

The packet conversion unit 702 is further configured to obtain the unicast known-answer service answer packet transmitted by the packet receiving unit 701, convert the obtained unicast known-answer service answer packet into a multicast known-answer service answer packet, and transmit the multicast known-answer service answer packet to the packet sending unit 703.

The packet sending unit 703 is further configured to obtain the multicast known-answer service answer packet transmitted by the packet conversion unit 702, and send the multicast known-answer service answer packet to the user terminal.

Furthermore, the terminal identity included in the identity field of the unicast known-answer service query packet sent by the packet sending unit 703 is one of the following: a MAC address of the user terminal, an IP address of the user terminal, a serial number of the user terminal generated according to an address of the user terminal, and a serial number allocated by the relay to the user terminal.

Figure 8:
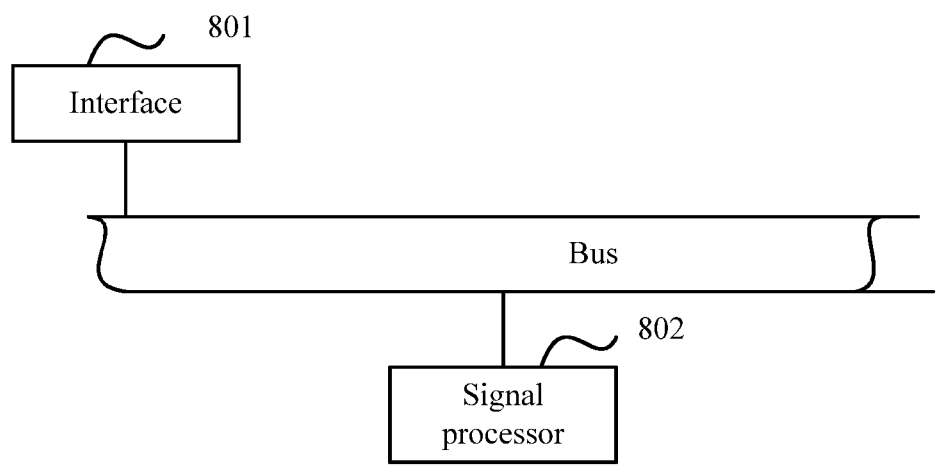
FIG. 8 is a schematic structural composition diagram of a relay proposed in Embodiment 3 of the present disclosure.

Correspondingly, Embodiment 3 of the present disclosure further proposes a relay, as shown in FIG. 8, including an interface 801 and a signal processor 802, where the interface 801 and the signal processor 802 are connected to each other using a bus and transmit data to each other using a bus.

The interface 801 is configured to receive a multicast known-answer service query packet that is sent by a user terminal and used to query service information in an mDNS, and transmit the received multicast known-answer service query packet to the signal processor 802.

The interface 801 may be one or more of the following: a network interface controller (NIC) that provides a wired interface, such as an Ethernet NIC, where the Ethernet NIC can provide a copper and/or optical interface, and a NIC that provides a wireless interface, such as a wireless local area network (WLAN) NIC.

The signal processor 802 is configured to obtain the multicast known-answer service query packet transmitted by the interface 801, and convert the obtained multicast known-answer service query packet into a unicast known-answer service query packet and transmit the unicast known-answer service query packet to the interface 801.

The signal processor 802 may be a central processing unit (CPU), or a combination of a CPU and a hardware chip. The signal processor 802 may also be a network processor (NP), a combination of a CPU and an NP, or a combination of an NP and a hardware chip.

The hardware chip may be one of or a combination of several of the following: an application-specific integrated circuit (ASIC), a field-programmable gate array (FPGA), and a complex programmable logic device (CPLD).

Optionally, if the signal processor 802 is a CPU or a combination of a CPU and a hardware chip, the relay may further include a memory, where the memory is configured to store program code, and the signal processor obtains the stored program code from the memory and performs corresponding processing according to the obtained program code.

The memory may be a volatile memory such as a random access memory (RAM) or a non-volatile memory such as a read-only memory (ROM), a flash memory, a hard disk drive (HDD), or a solid-state drive (SSD), or a combination of the foregoing types of memories.

The interface 801 is further configured to obtain the unicast known-answer service query packet transmitted by the signal processor 802, and send the obtained unicast known-answer service query packet to a gateway, where the unicast known-answer service query packet includes a service type requested by the user terminal, and an identity field of the unicast known-answer service query packet includes a terminal identity determined by the relay for the user terminal that sends the multicast known-answer service query packet.

The terminal identity included in the identity field of the unicast known-answer service query packet sent by the interface 801 is one of the following: a MAC address of the user terminal obtained by the signal processor 802, an Internet Protocol address of the user terminal obtained by the signal processor 802, a serial number of the user terminal generated by the signal processor 802 according to an address of the user terminal, or a serial number allocated by the signal processor 802 to the user terminal. When the terminal identity is a serial number of the user terminal generated by the signal processor 802 according to an address of the user terminal or a serial number allocated by the signal processor 802 to the user terminal, it is necessary to transmit the serial number of the user terminal generated according to the address of the user terminal or the serial number allocated by the signal processor 802 to the user terminal to the memory, and the memory stores the serial number of the user terminal generated according to the address of the user terminal or the serial number allocated by the signal processor 802 to the user terminal.

The interface 801 is further configured to receive a unicast known-answer service answer packet that is sent by the gateway and includes service information unknown to the user terminal, and transmit the unicast known-answer service answer packet to the signal processor, where the service information unknown to the user terminal is obtained by the gateway after removing, based on the terminal identity included in the received unicast known-answer service query packet, all service information known to the user terminal corresponding to the terminal identity from an established correspondence between a terminal identity and known service information.

The signal processor 802 is further configured to obtain the unicast known-answer service answer packet transmitted by the interface 801, convert the obtained unicast known-answer service answer packet into a multicast known-answer service answer packet, and send the multicast known-answer service answer packet to the user terminal.

Figure 9:
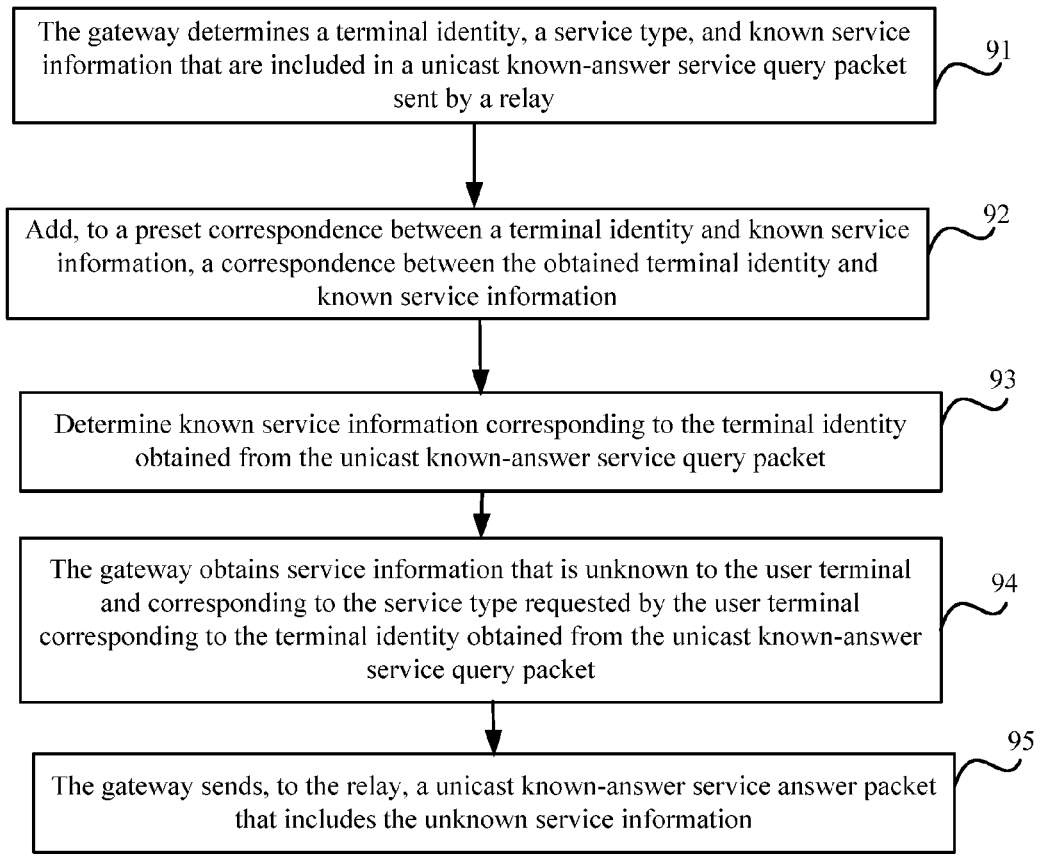
FIG. 9 is a flowchart of a proposed packet transmission method in an mDNS in Embodiment 3 of the present disclosure, where the method is applied on a gateway side.

For a gateway in the system, a specific processing procedure of the method is shown in FIG. 9:

Step 91: The gateway obtains a terminal identity in an identity field of a unicast known-answer service query packet sent by a relay, and obtains service information that is known to a user terminal and in the unicast known-answer service query packet.

The terminal identity is determined by the relay for the user terminal when the relay receives a multicast known-answer service query packet sent by the user terminal. For a specific implementation manner of determining, by the relay, the terminal identity for the user terminal that sends the multicast known-answer service query packet, refer to the detailed description in the foregoing Embodiment 1 and Embodiment 2. Details are not provided in Embodiment 3 of the present disclosure again.

Step 92: The gateway adds, according to a saved correspondence between a terminal identity and known service information, the known service information obtained from the unicast known-answer service query packet to the gateway-saved correspondence between a terminal identity and known service information and to known service information corresponding to the terminal identity obtained from the unicast known-answer service query packet.

Step 93: Determine, from the gateway-saved correspondence between a terminal identity and known service information, the known service information corresponding to the terminal identity obtained from the unicast known-answer service query packet, where the known service information obtained from the unicast known-answer service query packet has been added to the gateway-saved correspondence.

After obtaining the terminal identity and the known service information from the unicast known-answer service query packet, the gateway further includes: if the gateway-saved correspondence between a terminal identity and known service information does not include the terminal identity obtained from the unicast known-answer service query packet, establishing, in the gateway-saved correspondence between a terminal identity and known service information, a correspondence between the terminal identity obtained from the unicast known-answer service query packet and the known service information obtained from the unicast known-answer service query packet.

Step 94: After removing the determined known service information from determined all service information, the gateway obtains service information that is unknown to the user terminal and corresponding to a service type requested by the user terminal corresponding to the terminal identity obtained from the unicast known-answer service query packet.

Step 95: The gateway sends, to the relay, a unicast known-answer service answer packet that includes the unknown service information.

Optionally, after the gateway obtains the terminal identity in the identity field of the unicast known-answer service query packet sent by the relay, the method further includes: obtaining, by the gateway, an address of the relay, where the gateway-saved correspondence between a terminal identity and known service information further includes the address of the relay.

Figure 10:
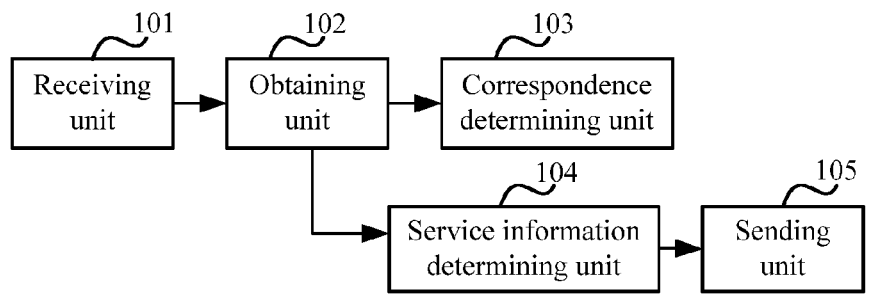
FIG. 10 is a schematic structural composition diagram of a packet transmission apparatus in an mDNS proposed in Embodiment 3 of the present disclosure.

Correspondingly, Embodiment 3 of the present disclosure further proposes a packet transmission apparatus in an mDNS, as shown in FIG. 10, including: a receiving unit 101 configured to receive a unicast known-answer service query packet sent by a relay, and transmit the unicast known-answer service query packet to an obtaining unit 102, the obtaining unit 102 configured to obtain the unicast known-answer service query packet transmitted by the receiving unit 101, obtain a terminal identity in an identity field of the unicast known-answer service query packet, obtain service information that is known to a user terminal and in the unicast known-answer service query packet, and transmit the obtained terminal identity and the service information known to the user terminal to a correspondence determining unit 103, the correspondence determining unit 103 configured to obtain the obtained terminal identity, a service type, and the service information known to the user terminal that are transmitted by the obtaining unit 102, add, according to a saved correspondence between a terminal identity and known service information, the known service information obtained from the unicast known-answer service query packet to the saved correspondence between a terminal identity and known service information and to known service information corresponding to the terminal identity obtained from the unicast known-answer service query packet, and transmit an updated correspondence between a terminal identity and known service information to the obtaining unit 102. Where the obtaining unit 102 is further configured to obtain the updated correspondence, transmitted by the correspondence determining unit 103, between a terminal identity and known service information, determine, from the gateway-saved correspondence between a terminal identity and known service information, the known service information corresponding to the terminal identity obtained from the unicast known-answer service query packet, and transmit the obtained known service information to a service information determining unit 104, where the known service information obtained from the unicast known-answer service query packet has been added to the gateway-saved correspondence. The service information determining unit 104 configured to obtain the known service information transmitted by the obtaining unit 102, determine all service information corresponding to a service type that is requested by the user terminal and obtained from the received unicast known-answer service query packet, obtain, after the determined known service information is removed from the determined all service information, service information that is unknown to the user terminal and corresponding to the service type requested by the user terminal corresponding to the terminal identity obtained from the unicast known-answer service query packet, and transmit the unknown service information to a sending unit, and the sending unit 105 configured to obtain the unknown service information transmitted by the service information determining unit 104, and send, to the relay, a unicast known-answer service answer packet that includes the unknown service information.

Furthermore, the correspondence determining unit 103 is further configured to, if the saved correspondence between a terminal identity and known service information does not include the terminal identity obtained from the unicast known-answer service query packet, establish, in the gateway-saved correspondence between a terminal identity and known service information, a correspondence between the terminal identity obtained from the unicast known-answer service query packet and the known service information obtained from the unicast known-answer service query packet.

The obtaining unit 102 is further configured to, after the terminal identity in the identity field of the unicast known-answer service query packet sent by the relay is obtained, obtain an address of the relay, and transmit the obtained address of the relay to the correspondence determining unit 103. The correspondence determining unit 103 is configured to obtain the address of the relay transmitted by the obtaining unit, where the saved correspondence between a terminal identity and known service information further includes the address of the relay.

Figure 11:
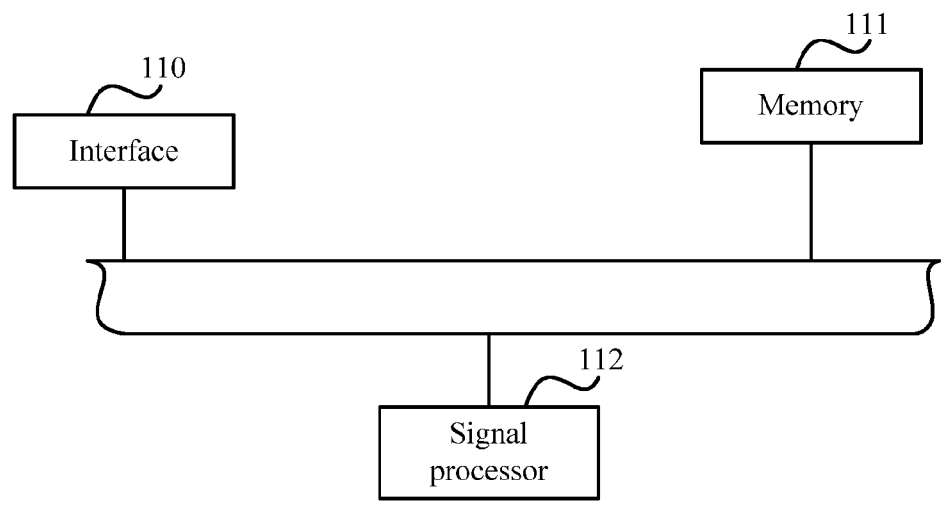
FIG. 11 is a schematic structural composition diagram of a gateway proposed in Embodiment 3 of the present disclosure.

Correspondingly, Embodiment 3 of the present disclosure further proposes a gateway, as shown in FIG. 11, including: an interface 110, a memory 111, and a signal processor 112. The interface 110, the memory 111, and the signal processor 112 are connected to each other using a bus, and transmit data using the bus.

The interface 110 is configured to receive a unicast known-answer service query packet sent by a relay, and transmit the unicast known-answer service query packet to the signal processor 112.

The interface 110 may be one or more of the following: an NIC that provides a wired interface, such as an Ethernet NIC, where the Ethernet NIC can provide a copper and/or optical interface, and a NIC that provides a wireless interface, such as a WLAN NIC.

The memory 111 is configured to store program instructions, and transmit the stored program instructions to the signal processor 112.

The memory 111 may be a volatile memory (such as a RAM), an HDD, or an SSD or a combination of the foregoing types of memories.

The signal processor 112 is configured to obtain the program instructions stored in the memory 111, so as to perform the following steps: obtaining the unicast known-answer service query packet transmitted by the interface 110, obtaining a terminal identity in an identity field of the unicast known-answer service query packet, obtaining a service type that is requested by a user terminal and included in the unicast known-answer service query packet, and service information that is known to the user terminal and corresponding to the service type, and transmitting, to the memory 111, the obtained terminal identity, service type, and service information known to the user terminal.

The signal processor 112 may be a CPU or a combination of a CPU and a hardware chip. The signal processor 112 may further be an NP, a combination of a CPU and an NP, or a combination of an NP and a hardware chip.

The hardware chip may be one of or a combination of several of: an ASIC, an FPGA, and a CPLD.

The memory 111 is further configured to obtain the obtained terminal identity, the service type, and the service information known to the user terminal that are transmitted by the signal processor 112.

The signal processor 112 is further configured to add, according to a correspondence, saved by the memory 111, between a terminal identity and known service information, the known service information obtained from the unicast known-answer service query packet to the saved correspondence between a terminal identity and known service information and to known service information corresponding to the terminal identity obtained from the unicast known-answer service query packet, and transmit an updated correspondence between a terminal identity and known service information to the memory 111.

The signal processor 112 is further configured to obtain the updated correspondence, transmitted by the memory 111, between a terminal identity and known service information; determine, from the gateway-saved correspondence between a terminal identity and known service information, the known service information corresponding to the terminal identity obtained from the unicast known-answer service query packet, where the known service information obtained from the unicast known-answer service query packet has been added to the gateway-saved correspondence, determine all service information corresponding to the service type that is requested by the user terminal and obtained from the received unicast known-answer service query packet, obtain, after the determined known service information is removed from the determined all service information, service information that is unknown to the user terminal and corresponding to the service type requested by the user terminal corresponding to the terminal identity obtained from the unicast known-answer service query packet, and transmit the unknown service information to the interface 110.

The interface 110 is further configured to obtain the unknown service information transmitted by the signal processor 112 and send, to the relay, a unicast known-answer service answer packet that includes the unknown service information.

The signal processor 112 is further configured to, if the correspondence, saved by the memory 111, between a terminal identity and known service information does not include the terminal identity obtained from the unicast known-answer service query packet, establish, in the gateway-saved correspondence between a terminal identity and known service information, a correspondence between the terminal identity obtained from the unicast known-answer service query packet and the known service information obtained from the unicast known-answer service query packet; and transmit, to the memory 111 for saving, the established correspondence between the terminal identity obtained from the unicast known-answer service query packet and the known service information obtained from the unicast known-answer service query packet.

The signal processor 112 is further configured to, after the terminal identity in the identity field of the unicast known-answer service query packet sent by the relay is obtained, obtain an address of the relay and transmit the obtained address of the relay to the memory 111. The memory 111 is configured to obtain the address of the relay transmitted by the signal processor 112, where the saved correspondence between a terminal identity and known service information further includes the address of the relay.

A person skilled in the art should understand that the embodiments of the present disclosure may be provided as a method, an apparatus (device), or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a read-only memory, an optical memory, and the like) that include computer-usable program code.

The present disclosure is described with reference to the flowcharts and/or block diagrams of the method, the apparatus (device), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specified function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the other programmable device provide steps for implementing a specific function in one or more processes in the flowcharts and/or in one or more blocks in the block diagrams.

Although some exemplary embodiments of the present disclosure have been described, persons skilled in the art can make changes and modifications to these embodiments once they learn the basic inventive concept. Therefore, the following claims are intended to be construed as to cover the exemplary embodiments and all changes and modifications falling within the scope of the present disclosure.

What is claimed is:

1. A packet transmission method in a multicast domain name system (mDNS), comprising:
converting, by a relay, a multicast known-answer service query packet that is sent by a user terminal and used to query service information in the mDNS, into the unicast known-answer service query packet;
sending the unicast known-answer service query packet to a gateway, wherein an identity field of the unicast known-answer service query packet comprises a terminal identity determined by the relay for the user terminal that sends the multicast known-answer service query packet;
receiving, by the relay, a unicast known-answer service answer packet that is sent by the gateway and comprises service information unknown to the user terminal, wherein the service information unknown to the user terminal is obtained by the gateway after removing, based on the terminal identity comprised in the received unicast known-answer service query packet, all service information known to the user terminal corresponding to the terminal identity from an established correspondence between a terminal identity and known service information;
converting, by the relay, the unicast known-answer service answer packet into a multicast known-answer service answer packet; and
sending the multicast known-answer service answer packet to the user terminal.

2. The method according to claim 1, wherein the terminal identity comprised in the identity field of the unicast known-answer service query packet is one of the following:
a media access control (MAC) address of the user terminal;
an Internet Protocol (IP) address of the user terminal;
a serial number of the user terminal generated according to an address of the user terminal; and
a serial number allocated by the relay to the user terminal.

3. A packet transmission method in a multicast domain name system (mDNS), comprising:
obtaining, by a gateway, a terminal identity in an identity field of a unicast known-answer service query packet sent by a relay;
obtaining, by the gateway, known service information in the unicast known-answer service query packet;
adding, by the gateway according to a gateway-saved correspondence between a terminal identity and known service information, the known service information obtained from the unicast known-answer service query packet to the gateway-saved correspondence between a terminal identity and known service information and to known service information corresponding to the terminal identity obtained from the unicast known-answer service query packet;
determining, from the gateway-saved correspondence between the terminal identity and known service information, the known service information corresponding to the terminal identity obtained from the unicast known-answer service query packet, wherein the known service information obtained from the unicast known-answer service query packet has been added to the gateway-saved correspondence;
determining, by the gateway, all service information corresponding to a service type that is requested by a user terminal and obtained from the received unicast known-answer service query packet;
obtaining, by the gateway after removing the determined known service information from the determined all service information, service information that is unknown to the user terminal and corresponding to the service type requested by the user terminal corresponding to the terminal identity obtained from the unicast known-answer service query packet; and
sending, by the gateway to the relay, a unicast known-answer service answer packet that comprises the unknown service information.

4. The method according to claim 3, wherein after the obtaining, by a gateway, a terminal identity and known service information in the unicast known-answer service query packet, the method further comprises establishing, in the gateway-saved correspondence between a terminal identity and known service information, a correspondence between the terminal identity obtained from the unicast known-answer service query packet and the known service information obtained from the unicast known-answer service query packet when the gateway-saved correspondence between the terminal identity and known service information does not comprise the terminal identity obtained from the unicast known-answer service query packet.

5. The method according to claim 3, wherein after the obtaining, by a gateway, a terminal identity in an identity field of a unicast known-answer service query packet sent by a relay, the method further comprises obtaining, by the gateway, an address of the relay, wherein the gateway-saved correspondence between a terminal identity and known service information further comprises the address of the relay.

6. A relay, which is applied to a multicast domain name system (mDNS) comprises:
an interface;
a signal processor coupled with the interface, wherein the signal processor and the interface are configured to transmit data to each other,
wherein the interface is further configured to:
receive a multicast known-answer service query packet that is sent by a user terminal and used to query service information in an mDNS; and
transmit the received multicast known-answer service query packet to the signal processor,
wherein the signal processor is further configured to:
obtain the multicast known-answer service query packet transmitted by the interface;
convert the obtained multicast known-answer service query packet into a unicast known-answer service query packet; and
transmit the unicast known-answer service query packet to the interface, wherein the interface is further configured to:
obtain the unicast known-answer service query packet transmitted by the signal processor,
send the obtained unicast known-answer service query packet to a gateway, wherein an identity field of the unicast known-answer service query packet comprises a terminal identity determined by the relay for the user terminal that sends the multicast known-answer service query packet;
receive a unicast known-answer service answer packet that is sent by the gateway and comprises service information unknown to the user terminal;
transmit the unicast known-answer service answer packet to the signal processor, and wherein the service information unknown to the user terminal is obtained by the gateway after removing, based on the terminal identity comprised in the received unicast known-answer service query packet, all service information known to the user terminal corresponding to the terminal identity from an established correspondence between a terminal identity and known service information, wherein the signal processor is further configured to:
- obtains the unicast known-answer service answer packet transmitted by the interface;
- convert the obtained unicast known-answer service answer packet into a multicast known-answer service answer packet; and
- transmits the multicast known-answer service answer packet to the user terminal.

7. The relay according to claim 6, wherein the terminal identity comprised in the identity field of the unicast known-answer service query packet is one of the following:
- a media access control (MAC) address of the user terminal;
- an Internet Protocol (IP) address of the user terminal;
- a serial number of the user terminal generated according to an address of the user terminal; and
- a serial number allocated by the relay to the user terminal.

8. A gateway, which is applied to a multicast domain name system (mDNS) comprises:
- an interface;
- a memory;
- a signal processor, wherein the interface, the memory, and the signal processor are connected to each other using a bus, wherein the interface is configured to:
- receive a unicast known-answer service query packet sent by a relay, and
- transmit the unicast known-answer service query packet to the signal processor, wherein the memory is configured to:
- store program instructions; and
- transmit the stored program instructions to the signal processor, wherein the signal processor is configured to:
- obtain the program instructions stored in the memory, wherein to perform the following steps:
  - obtain the unicast known-answer service query packet transmitted by the interface;
  - obtain a terminal identity in an identity field of the unicast known-answer service query packet;
  - obtain known service information in the unicast known-answer service query packet; and
  - transmit the obtained terminal identity and the obtained known service information to the memory, wherein the memory is further configured to obtain the obtained terminal identity and the obtained known service information that are transmitted by the signal processor;

wherein the signal processor is further configured to:
- add, according to a gateway-saved correspondence between a terminal identity and known service information, the known service information obtained from the unicast known-answer service query packet to the saved correspondence between the terminal identity and known service information and to known service information corresponding to the terminal identity obtained from the unicast known-answer service query packet;
- transmit an updated correspondence between a terminal identity and known service information to the memory;
- obtain the updated correspondence, transmitted by the memory, between a terminal identity and known service information,
- determine, from the gateway-saved correspondence between a terminal identity and known service information, the known service information corresponding to the terminal identity obtained from the unicast known-answer service query packet, wherein the known service information obtained from the unicast known-answer service query packet has been added to the gateway-saved correspondence;
- determine all service information corresponding to a service type that is requested by a user terminal and obtained from the received unicast known-answer service query packet;
- obtain, after the determined known service information is removed from the determined all service information, service information that is unknown to the user terminal and corresponding to the service type requested by the user terminal corresponding to the terminal identity obtained from the unicast known-answer service query packet; and
- transmit the unknown service information to the interface, wherein the interface is further configured to:
- obtain the unknown service information transmitted by the signal processor; and
- send, to the relay, a unicast known-answer service answer packet that comprises the unknown service information.

9. The gateway according to claim 8, wherein when the gateway-saved correspondence between a terminal identity and known service information does not comprise the terminal identity obtained from the unicast Known-Answer service query packet, the signal processor is further configured to:
- establish, in the saved correspondence between a terminal identity and known service information, a correspondence between the terminal identity obtained from the unicast known-answer service query packet and the known service information obtained from the unicast known-answer service query packet; and
- transmit, to the memory for saving, the established correspondence between the terminal identity obtained from the unicast known-answer service query packet and the known service information obtained from the unicast known-answer service query packet.

10. The gateway according to claim 8, the signal processor is further configured to:
- obtain an address of the relay, after obtaining the terminal identity in the identity field of the unicast known-answer service query packet sent by the relay;
- transmit the obtained address of the relay to the memory, and wherein the memory is further configured to:
- obtain the address of the relay transmitted by the signal processor; and
- save the address of the relay into the saved correspondence between the terminal identity and known service information.

* * * * *